US012207327B2

(12) United States Patent
Zhao et al.

(10) Patent No.: US 12,207,327 B2
(45) Date of Patent: Jan. 21, 2025

(54) SIDELINK INTERFACE RADIO BEARER CONFIGURATION METHOD, TERMINAL AND NETWORK DEVICE

(71) Applicant: DATANG MOBILE COMMUNICATIONS EQUIPMENT CO., LTD., Beijing (CN)

(72) Inventors: Yali Zhao, Beijing (CN); Li Chen, Beijing (CN); Da Wang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 416 days.

(21) Appl. No.: 17/632,185

(22) PCT Filed: Jul. 15, 2020

(86) PCT No.: PCT/CN2020/102118
§ 371 (c)(1),
(2) Date: Feb. 1, 2022

(87) PCT Pub. No.: WO2021/022986
PCT Pub. Date: Feb. 11, 2021

(65) Prior Publication Data
US 2022/0272778 A1 Aug. 25, 2022

(30) Foreign Application Priority Data

Aug. 7, 2019 (CN) .......................... 201910726812.7
Sep. 20, 2019 (CN) .......................... 201910892021.1

(51) Int. Cl.
*H04W 76/14* (2018.01)
*H04W 76/11* (2018.01)

(52) U.S. Cl.
CPC ............ *H04W 76/14* (2018.02); *H04W 76/11* (2018.02)

(58) Field of Classification Search
None
See application file for complete search history.

(56) References Cited

U.S. PATENT DOCUMENTS

| 2017/0048922 | A1  | 2/2017 | Lee et al. |
| 2020/0213894 | A1  | 7/2020 | Agiwal et al. |
| 2022/0217575 | A1* | 7/2022 | Wang .................... H04W 76/14 |

FOREIGN PATENT DOCUMENTS

| CN | 106470384 A1  | 3/2017 |
| CN | 109565703 A1  | 4/2019 |
| WO | 2019141371 A1 | 7/2019 |

OTHER PUBLICATIONS

First Office Action for Chinese Patent Application No. 201910892021.1, issued on Nov. 2, 2021 and its English Translation provided by applicant's foreign counsel.

(Continued)

*Primary Examiner* — Elton Williams
(74) *Attorney, Agent, or Firm* — Ladas & Parry, LLP

(57) ABSTRACT

The present disclosure provides a sidelink interface radio bearer configuration method, a terminal and a network device. The method includes: receiving sidelink radio bearer (SLRB) configuration information transmitted by a second terminal; transmitting assistance information to a first network device serving the first terminal and/or determining whether to allow to establish the target SLRB according to the SLRB configuration information.

17 Claims, 7 Drawing Sheets

(56) References Cited

OTHER PUBLICATIONS

Second Office Action for Chinese Patent Application No. 2019108920211, issued on May 11, 2022 and its English Translation provided by Global Dossier.
International Search Report for PCT Application PCT/CN2020/102118 issued on Oct. 21, 2020 and its English Translation provided by WIPO.
Written Opinion for PCT Application PCT/CN2020/102118 issued on Oct. 21, 2020, and its English Translation provided by WIPO.
Internationally Preliminary Report on Patentability for PCT/CN2020/102118 issued on Feb. 8, 2022, and English translation provided by WIPO.
"SL RBs/LCHs and SL RB Configurations for NR Sidelink," 3GPP TSG-RAN2 106, R2-1905728, Reno, USA, May 13-May 17, 2019, Samsung, all pages.
"Support for Simultaneous Configuration of Mode 1 and Mode 2," 3GPP TSG-RAN WG2 Meeting #10, R2-1905810, Reno, USA, May 13-17, 2019, CATT, all pages.
"Support of RLC AM for unicast and related SLRB configuration," R2-1907457, Reno, USA, May 13-17, 2019, Agenda Item: 11.4.6, Source: Huawei, HiSilicon, all pages.
Extended European Search Report for European Patent Application 20851079.2 issued on Jul. 20, 2022 by the European Patent Office.
"Summary of Email Discussion [104#58][NR V2X]—QoS support for NR V2X," 3GPP TSG-RAN WG2 Meeting #105, R2-1900370, Athens, Greece, Feb. 25-Mar. 1, 2019, Agenda Item: 11.4.5, Source: Huawei, all pages.
"Discussion on network involvement in unicast link establishment," 3GPP TSG-RAN WG2 Meeting #106, R2-1905580, Reno, US, May 13-May 17, 2019, Agenda Item: 11.4.5, Source: OPPO, all pages.
"Discussion on QoS support for NRV2X," 3GPP TSG-RAN WG2 Meeting #106, R2-1906496, Reno, USA, May 13 -17, 2019, Agenda Item: 11.4.6, Source: ZTE Corporation, Sanechips, all pages.
"QoS for NR V2X," 3GPP TSG-RAN WG2 Meeting #105bis, R2-1907579, Reno, USA, May 13-17, 2019, Agenda Item: 11.4.5, Source: Qualcomm Incorporated, all pages.
"Open Issues for the Bi-directional SLRB," 3GPP TSG-RAN WG2 Meeting #108, R2-1914450, Reno, USA, Nov. 18-22, 2019, Agenda Item: 6.4.2, Source: CATT, all pages.

* cited by examiner

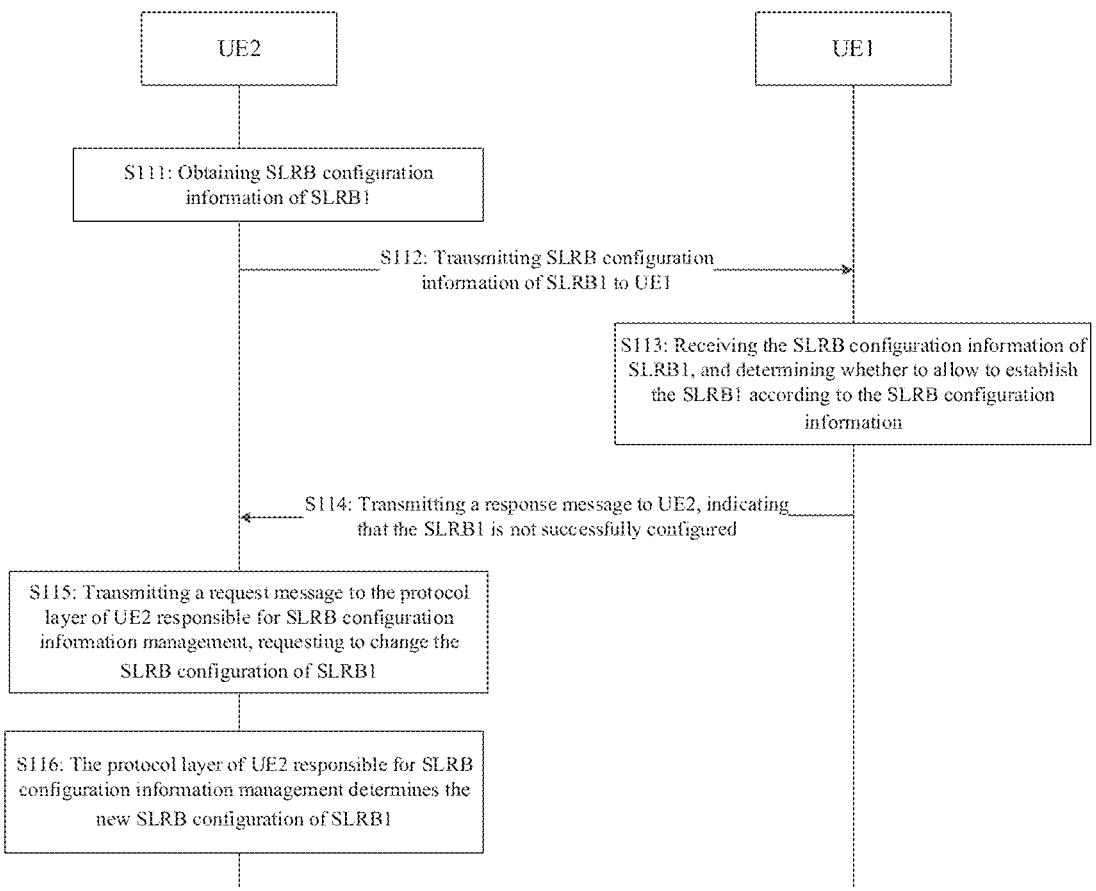

SIDELINK INTERFACE RADIO BEARER CONFIGURATION METHOD, TERMINAL AND NETWORK DEVICE

CROSS-REFERENCE TO RELATED APPLICATIONS

This application is the U.S. national phase of PCT Application No. PCT/CN2020/102118 filed on Jul. 15, 2020, which claims priorities of the Chinese patent application No. 201910726812.7 filed on Aug. 7, 2019 and the Chinese patent application No. 201910892021.1 filed on Sep. 20, 2019, the disclosure of which are incorporated herein by reference in their entireties.

TECHNICAL FIELD

The present disclosure relates to the field of communications technology, in particular to a sidelink interface radio bearer configuration method, a terminal and a network device.

BACKGROUND

For the fifth generation of mobile communication technology (5G), in order to support vertical applications in the industry, New Radio (NR) Vehicle to Everything (V2X) is introduced. NR V2X supports three transmission modes in the sidelink interface: unicast communication, broadcast communication and multicast communication.

For communication on the sidelink interface, the radio bearer between two terminals in sidelink communication allows the use of Radio Link Control (RLC) Acknowledge Mode (AM). The RLC AM mode supports bi-directional radio bearer. According to the understanding of traditional RLC AM, the configuration of the bi-directional radio bearer needs to have exactly the same in the two directions. However, for the sidelink communication, when two terminals have different coverages (for example: one terminal is on the network, the other terminal is off the network, or the two terminals are both on the network but located in the coverage of different base stations) or different Radio Resource Control (RRC) states (for example, one terminal is in the connected state and the other terminal is in the idle state), the radio bearer configuration corresponding to different radio bearer Quality of Service (QoS) parameters set by the bearer configuration management node or protocol layer of the two terminals may be different, it may cause conflicts between the SLRB configuration of the Sidelink Radio Bearer (SLRB) in the two directions of the bi-directional radio bearer, or conflicts between the SLRB configuration of different SLRBs of the same terminal.

SUMMARY

An object of the present disclosure is to provide a sidelink interface radio bearer configuration method, a terminal and a network device, so as to solve the problem of radio bearer configuration conflict between two terminals in the sidelink communication in the related art.

In order to achieve the object, an embodiment of the present disclosure provides a sidelink interface radio bearer configuration method applied to a first terminal, including: receiving sidelink radio bearer (SLRB) configuration information transmitted by a second terminal; transmitting assistance information to a first network device serving the first terminal and/or determining whether to allow to establish the target SLRB according to the SLRB configuration information.

In an embodiment of the present disclosure, after determining whether to allow to establish the target SLRB according to the SLRB configuration information, the method further includes: when the determination result is that the target SLRB is allowed to be established, transmitting the assistance information to the first network device or a protocol layer of the first terminal responsible for SLRB configuration information management; or, when the determination result is that the target SLRB is allowed to be established, transmitting a first response message to the second terminal, wherein the first response message is used to indicate that the target SLRB is successfully configured; or, when the determination result is that the target SLRB is refused to be established, transmitting a second response message to the second terminal, wherein the second response message is used to indicate that the target SLRB is not successfully configured.

In an embodiment of the present disclosure, the assistance information includes at least one of the following: radio bearer identification (ID) of the target SLRB; logical channel ID of the target SLRB; part or all of the SLRB configurations transmitted by the first terminal.

In an embodiment of the present disclosure, the first terminal is on the network and in a radio resource control (RRC) idle or inactive state, or the first terminal is off the network, when the determination result is that the target SLRB is allowed to be established, after transmitting the assistance information to the first network device or the protocol layer of the first terminal responsible for SLRB configuration information management, the method further includes: performing, by the protocol layer of the first terminal responsible for the SLRB configuration information management, SLRB configuration on the SLRB of the first terminal according to the assistance information.

In an embodiment of the present disclosure, the performing, by the protocol layer of the first terminal responsible for the SLRB configuration information management, SLRB configuration on the SLRB of the first terminal according to the assistance information includes at least one of the following: when performing the SLRB configuration on the target SLRB corresponding to the assistance information, configuring the SLRB configuration information of the SLRB of the first terminal to be the same as the SLRB configuration information of the target SLRB; when performing configuration on other SLRBs other than the target SLRB corresponding to the assistance information and belonging to the sidelink formed by the first terminal and the second terminal, configuring a logical channel ID included in the SLRB configuration information of the other SLRBs to be different from the logical channel ID included in the SLRB configuration information of the target SLRB; when performing configuration on other SLRBs other than the target SLRB corresponding to the assistance information and belonging to the sidelink formed by the first terminal and the second terminal and having a same source ID and a same target ID as the target SLRB, configuring a logical channel ID included in the SLRB configuration information of the other SLRBs to be different from the logical channel ID included in the SLRB configuration information of the target SLRB; when the logical channel ID included in the SLRB configuration information of the other SLRBs other than the target SLRB corresponding to the assistance information and belonging to the sidelink formed by the first terminal and the second terminal is the same as the logical channel ID included in the SLRB configuration information of the target SLRB, updating the logical channel ID of the other SLRBs to be different from the logical channel ID included in the SLRB configuration information of the target SLRB; when the logical channel ID included in the SLRB configuration information of the other SLRBs other than the target SLRB corresponding to the assistance information and belonging to the sidelink formed by the first terminal and the second terminal and having the same source ID and the same target ID as the target SLRB is the same as the logical channel ID included in the SLRB configuration information of the target SLRB, updating the logical channel ID of the other SLRBs to be different from the logical channel ID included in the SLRB configuration information of the target SLRB.

In an embodiment of the present disclosure, the second response message carries at least one of the following information: being empty; a reason that the target SLRB is not successfully configured; first indication information of part or all of logical channel IDs currently occupied by the first terminal on the sidelink formed by the first terminal and the second terminal; second indication information of part or all of the logical channel IDs currently occupied by the first terminal in a logical channel ID set corresponding to combination of the source ID and the target ID corresponding to the target SLRB on the sidelink formed by the first terminal and the second terminal; third indication information of all or part of the logical channel IDs currently available by the first terminal on the sidelink formed by the first terminal and the second terminal; fourth indication information of part or all of the logical channel IDs currently available by the first terminal in the logical channel ID set corresponding to the combination of the source ID and the target ID corresponding to the target SLRB on the sidelink formed by the first terminal and the second terminal.

In an embodiment of the present disclosure, the determining whether to allow to establish the target SLRB according to the SLRB configuration information includes: determining whether a logical channel ID included in SLRB configuration information corresponding to the target SLRB currently being established between the first terminal and the second terminal is the same as a logical channel ID included in SLRB configuration information corresponding to another SLRB that has been established or is being established between the first terminal and the second terminal; or, determining whether the logical channel ID included in the SLRB configuration information corresponding to the target SLRB currently being established between the first terminal and the second terminal is the same as a logical channel ID included in SLRB configuration information corresponding to another SLRB that has been established or is being established between the first terminal and the second terminal and has a same source ID and a same destination ID as the target SLRB; or, determining whether a radio bearer ID included in SLRB configuration information corresponding to the target SLRB currently being established between the first terminal and the second terminal is the same as a radio bearer ID included in the SLRB configuration information corresponding to another SLRB that has been established or is being established between the first terminal and the second terminal; or, determining whether the radio bearer ID included in the SLRB configuration information corresponding to the target SLRB currently being established between the first terminal and the second terminal is the same as a radio bearer ID included in SLRB configuration information corresponding to another SLRB that has been established or is being established between the first terminal and the second terminal and has the same source ID and the same destination ID as the target SLRB; or, when the determination result is not the same, allowing to establish the target SLRB; or, when the determination result is the same and a target condition is met, allowing to establish the target SLRB; otherwise, refusing to establish the target SLRB.

In an embodiment of the present disclosure, the target condition includes at least one of the following: a quality of service (QoS) parameter of the target SLRB being higher than a QoS parameter of another SLRB currently being established between the first terminal and the second terminal and using a same logic channel ID or a same radio bearer ID as the target SLRB; the QoS parameter of the target SLRB being higher than a QoS parameter of another SLRB currently being established between the first terminal and the second terminal and using a same source ID, a same destination ID and a same logic channel ID or using a same source ID, a same destination ID and a same radio bearer ID as the target SLRB; the QoS parameter of the target SLRB being higher than a QoS parameter of another SLRB currently having been established between the first terminal and the second terminal and using a same logic channel ID or a same radio bearer ID as the target SLRB; the QoS parameter of the target SLRB being higher than a QoS parameter of another SLRB currently having been established between the first terminal and the second terminal and using a same source ID, a same destination ID and a same logic channel ID or using a same source ID, a same destination ID and a same radio bearer ID as the target SLRB; a priority of the second terminal that initiates the establishment of the target SLRB being higher than a priority of a terminal that initiates the establishment of the other SLRB that uses the same logical channel ID or the same radio bearer ID as the target SLRB; an initiation time of the target SLRB being earlier than an initiation time of the other SLRB that uses the same logical channel ID or the same radio bearer ID as the target SLRB.

In an embodiment of the present disclosure, the SLRB configuration information includes at least one of the following: source ID; target ID; transmission type ID; SLRB ID; service data adaptation protocol layer configuration information; packet data convergence protocol layer configuration information; radio link control layer configuration information; media access control layer configuration information; physical layer configuration information.

In an embodiment of the present disclosure, the protocol layer responsible for SLRB configuration information management is an RRC protocol layer.

In an embodiment of the present disclosure, the first network device is a serving base station, a serving distributed unit, or a serving centralized unit of the first terminal.

In order to achieve the above object, an embodiment of the present disclosure provides a sidelink interface radio bearer configuration method, applied to a first network device, including: receiving assistance information transmitted by a first terminal; performing SLRB configuration on SLRB of the first terminal according to the assistance information; and/or, determining whether a target SLRB is allowed to be established according to the assistance information.

In an embodiment of the present disclosure, the assistance information includes at least one of the following: radio bearer identification (ID) of the target SLRB; logical channel ID of the target SLRB; part or all of the SLRB configurations transmitted by the first terminal.

In an embodiment of the present disclosure, after determining whether the target SLRB is allowed to be established according to the assistance information, the method further includes: generating indication information according to the determination result, wherein the indication information is used to indicate whether the first terminal allows to establish the target SLRB and/or indicate the first terminal to use part or all of the SLRB configuration information used by the target SLRB to transmit data.

In an embodiment of the present disclosure, the performing SLRB configuration on the SLRB of the first terminal according to the assistance information includes at least one of the following: when performing the SLRB configuration on the target SLRB corresponding to the assistance information, configuring the SLRB configuration information of the SLRB of the first terminal to be the same as the SLRB configuration information of the target SLRB; when performing configuration on other SLRBs other than the target SLRB corresponding to the assistance information and belonging to the sidelink formed by the first terminal and the second terminal, configuring a logical channel ID included in the SLRB configuration information of the other SLRBs to be different from the logical channel ID included in the SLRB configuration information of the target SLRB; when performing configuration on other SLRBs other than the target SLRB corresponding to the assistance information and belonging to the sidelink formed by the first terminal and the second terminal and having a same source ID and a same target ID as the target SLRB, configuring a logical channel ID included in the SLRB configuration information of the other SLRBs to be different from the logical channel ID included in the SLRB configuration information of the target SLRB; when the logical channel ID included in the SLRB configuration information of the other SLRBs other than the target SLRB corresponding to the assistance information and belonging to the sidelink formed by the first terminal and the second terminal is the same as the logical channel ID included in the SLRB configuration information of the target SLRB, updating the logical channel ID of the other SLRBs to be different from the logical channel ID included in the SLRB configuration information of the target SLRB; when the logical channel ID included in the SLRB configuration information of the other SLRBs other than the target SLRB corresponding to the assistance information and belonging to the sidelink formed by the first terminal and the second terminal and having the same source ID and the same target ID as the target SLRB is the same as the logical channel ID included in the SLRB configuration information of the target SLRB, updating the logical channel ID of the other SLRBs to be different from the logical channel ID included in the SLRB configuration information of the target SLRB.

In an embodiment of the present disclosure, the SLRB configuration information includes at least one of the following: source ID; target ID; transmission type ID; SLRB ID; service data adaptation protocol layer configuration information; packet data convergence protocol layer configuration information; radio link control layer configuration information; media access control layer configuration information; physical layer configuration information.

In order to achieve the above object, an embodiment of the present disclosure provides a sidelink interface radio bearer configuration method, applied to a second terminal, including: transmitting SLRB configuration information to a first terminal.

In an embodiment of the present disclosure, the method further includes: receiving a first response message transmitted by the first terminal, wherein the first response message is used to indicate that the target SLRB is successfully configured; or, receiving a second response message transmitted by the first terminal, wherein the second response message is used to indicate that the target SLRB is not successfully configured.

In an embodiment of the present disclosure, the second response message carries at least one of the following information: being empty; a reason that the target SLRB is not successfully configured; first indication information of part or all of logical channel IDs currently occupied by the first terminal on the sidelink formed by the first terminal and the second terminal; second indication information of part or all of the logical channel IDs currently occupied by the first terminal in a logical channel ID set corresponding to combination of the source ID and the target ID corresponding to the target SLRB on the sidelink formed by the first terminal and the second terminal; third indication information of all or part of the logical channel IDs currently available by the first terminal on the sidelink formed by the first terminal and the second terminal; fourth indication information of part or all of the logical channel IDs currently available by the first terminal in the logical channel ID set corresponding to the combination of the source ID and the target ID corresponding to the target SLRB on the sidelink formed by the first terminal and the second terminal.

In an embodiment of the present disclosure, after the receiving the second response message transmitted by the first terminal, the method further includes: transmitting, to a second network device or a protocol layer of the second terminal responsible for SLRB configuration information management, request information for requesting to change the SLRB configuration information of the target SLRB.

In an embodiment of the present disclosure, the request information carries at least one of the following information: first indication information of part or all of logical channel IDs currently occupied by the first terminal on the sidelink formed by the first terminal and the second terminal; second indication information of part or all of the logical channel IDs currently occupied by the first terminal in a logical channel ID set corresponding to combination of the source ID and the target ID corresponding to the target SLRB on the sidelink formed by the first terminal and the second terminal; third indication information of all or part of the logical channel IDs currently available by the first terminal on the sidelink formed by the first terminal and the second terminal; fourth indication information of part or all of the logical channel IDs currently available by the first terminal in the logical channel ID set corresponding to the combination of the source ID and the target ID corresponding to the target SLRB on the sidelink formed by the first terminal and the second terminal.

In an embodiment of the present disclosure, the second terminal is on the network and in an RRC idle state or inactive state, or the second terminal is off the network; after transmitting, to a protocol layer of the second terminal responsible for SLRB configuration information management, request information for requesting to change the SLRB configuration information of the target SLRB, the method further includes: according to the request information, updating a logical channel ID included in the SLRB configuration information of the target SLRB to make it different from a logical channel ID included in the SLRB configuration information of another SLRB currently being established or having been established between the first terminal and the second terminal; or, according to the request information, updating the logical channel ID included in the SLRB configuration information of the target SLRB to make it different from a logical channel ID included in the SLRB configuration information of another SLRB currently being established or having been established between the first terminal and the second terminal and using a same source ID and a same target ID as the target SLRB.

In an embodiment of the present disclosure, the protocol layer responsible for SLRB configuration information management is an RRC protocol layer.

In an embodiment of the present disclosure, the second network device is a serving base station, a serving distributed unit, or a serving centralized unit of the second terminal.

In order to achieve the above objective, an embodiment of the present disclosure provides a sidelink interface radio bearer configuration method, applied to a second network device, including: receiving request information for changing SLRB configuration information of a target SLRB transmitted by a second terminal, wherein the SLRB configuration information of the target SLRB is SLRB configuration information of the target SLRB transmitted by the second terminal to a first terminal through a sidelink interface; according to the request information, updating a logical channel ID included in the SLRB configuration information of the target SLRB to make it different from a logical channel ID included in the SLRB configuration information of another SLRB currently being established or having been established between the first terminal and the second terminal; or, according to the request information, updating the logical channel ID included in the SLRB configuration information of the target SLRB to make it different from a logical channel ID included in the SLRB configuration information of another SLRB currently being established or having been established between the first terminal and the second terminal and using a same source ID and a same target ID as the target SLRB.

In order to achieve the above objective, an embodiment of the present disclosure provides a terminal, the terminal being a first terminal, comprising: a transceiver, a memory, a processor, and a program stored on the memory and executed by the processor, wherein the transceiver is configured to receive sidelink radio bearer (SLRB) configuration information transmitted by a second terminal; the processor is configured to transmit assistance information to a first network device serving the first terminal and/or determining whether to allow to establish the target SLRB according to the SLRB configuration information.

In an embodiment of the present disclosure, the processor is further configured to: when the determination result is that the target SLRB is allowed to be established, transmit the assistance information to the first network device or a protocol layer of the first terminal responsible for SLRB configuration information management; or, when the determination result is that the target SLRB is allowed to be established, transmit a first response message to the second terminal, wherein the first response message is used to indicate that the target SLRB is successfully configured; or, when the determination result is that the target SLRB is refused to be established, transmit a second response message to the second terminal, wherein the second response message is used to indicate that the target SLRB is not successfully configured.

In an embodiment of the present disclosure, the assistance information includes at least one of the following: radio bearer identification (ID) of the target SLRB; logical channel ID of the target SLRB; part or all of the SLRB configurations transmitted by the first terminal.

In an embodiment of the present disclosure, the first terminal is on the network and in a radio resource control (RRC) idle or inactive state, or the first terminal is off the network; and the processor is further configured to: perform, by the protocol layer of the first terminal responsible for the SLRB configuration information management, SLRB configuration on the SLRB of the first terminal according to the assistance information.

In an embodiment of the present disclosure, the processor is further configured to: when performing the SLRB configuration on the target SLRB corresponding to the assistance information, configure the SLRB configuration information of the SLRB of the first terminal to be the same as the SLRB configuration information of the target SLRB; when performing configuration on other SLRBs other than the target SLRB corresponding to the assistance information and belonging to the sidelink formed by the first terminal and the second terminal, configure a logical channel ID included in the SLRB configuration information of the other SLRBs to be different from the logical channel ID included in the SLRB configuration information of the target SLRB; when performing configuration on other SLRBs other than the target SLRB corresponding to the assistance information and belonging to the sidelink formed by the first terminal and the second terminal and having a same source ID and a same target ID as the target SLRB, configure a logical channel ID included in the SLRB configuration information of the other SLRBs to be different from the logical channel ID included in the SLRB configuration information of the target SLRB; when the logical channel ID included in the SLRB configuration information of the other SLRBs other than the target SLRB corresponding to the assistance information and belonging to the sidelink formed by the first terminal and the second terminal is the same as the logical channel ID included in the SLRB configuration information of the target SLRB, update the logical channel ID of the other SLRBs to be different from the logical channel ID included in the SLRB configuration information of the target SLRB; when the logical channel ID included in the SLRB configuration information of the other SLRBs other than the target SLRB corresponding to the assistance information and belonging to the sidelink formed by the first terminal and the second terminal and having the same source ID and the same target ID as the target SLRB is the same as the logical channel ID included in the SLRB configuration information of the target SLRB, update the logical channel ID of the other SLRBs to be different from the logical channel ID included in the SLRB configuration information of the target SLRB.

In an embodiment of the present disclosure, the second response message carries at least one of the following information: being empty; a reason that the target SLRB is not successfully configured; first indication information of part or all of logical channel IDs currently occupied by the first terminal on the sidelink formed by the first terminal and the second terminal; second indication information of part or all of the logical channel IDs currently occupied by the first terminal in a logical channel ID set corresponding to combination of the source ID and the target ID corresponding to the target SLRB on the sidelink formed by the first terminal and the second terminal; third indication information of all or part of the logical channel IDs currently available by the first terminal on the sidelink formed by the first terminal and the second terminal; fourth indication information of part or all of the logical channel IDs currently available by the first terminal in the logical channel ID set corresponding to the combination of the source ID and the target ID corresponding to the target SLRB on the sidelink formed by the first terminal and the second terminal.

In an embodiment of the present disclosure, the processor is further configured to: determine whether a logical channel ID included in SLRB configuration information corresponding to the target SLRB currently being established between the first terminal and the second terminal is the same as a logical channel ID included in SLRB configuration information corresponding to another SLRB that has been established or is being established between the first terminal and the second terminal; or, determine whether the logical channel ID included in the SLRB configuration information corresponding to the target SLRB currently being established between the first terminal and the second terminal is the same as a logical channel ID included in SLRB configuration information corresponding to another SLRB that has been established or is being established between the first terminal and the second terminal and has a same source ID and a same destination ID as the target SLRB; or, determine whether a radio bearer ID included in SLRB configuration information corresponding to the target SLRB currently being established between the first terminal and the second terminal is the same as a radio bearer ID included in the SLRB configuration information corresponding to another SLRB that has been established or is being established between the first terminal and the second terminal; or, determine whether the radio bearer ID included in the SLRB configuration information corresponding to the target SLRB currently being established between the first terminal and the second terminal is the same as a radio bearer ID included in SLRB configuration information corresponding to another SLRB that has been established or is being established between the first terminal and the second terminal and has the same source ID and the same destination ID as the target SLRB; or, when the determination result is not the same, allow to establish the target SLRB; or, when the determination result is the same and a target condition is met, allow to establish the target SLRB; otherwise, refuse to establish the target SLRB.

In an embodiment of the present disclosure, the target condition includes at least one of the following: a quality of service (QoS) parameter of the target SLRB being higher than a QoS parameter of another SLRB currently being established between the first terminal and the second terminal and using a same logic channel ID or a same radio bearer ID as the target SLRB; the QoS parameter of the target SLRB being higher than a QoS parameter of another SLRB currently being established between the first terminal and the second terminal and using a same source ID, a same destination ID and a same logic channel ID or using a same source ID, a same destination ID and a same radio bearer ID as the target SLRB; the QoS parameter of the target SLRB being higher than a QoS parameter of another SLRB currently having been established between the first terminal and the second terminal and using a same logic channel ID or a same radio bearer ID as the target SLRB; the QoS parameter of the target SLRB being higher than a QoS parameter of another SLRB currently having been established between the first terminal and the second terminal and using a same source ID, a same destination ID and a same logic channel ID or using a same source ID, a same destination ID and a same radio bearer ID as the target SLRB;

a priority of the second terminal that initiates the establishment of the target SLRB being higher than a priority of a terminal that initiates the establishment of the other SLRB that uses the same logical channel ID or the same radio bearer ID as the target SLRB; an initiation time of the target SLRB being earlier than an initiation time of the other SLRB that uses the same logical channel ID or the same radio bearer ID as the target SLRB.

In an embodiment of the present disclosure, the SLRB configuration information includes at least one of the following: source ID; target ID; transmission type ID; SLRB ID; service data adaptation protocol layer configuration information; packet data convergence protocol layer configuration information; radio link control layer configuration information; media access control layer configuration information; physical layer configuration information.

In an embodiment of the present disclosure, the protocol layer responsible for SLRB configuration information management is an RRC protocol layer.

In an embodiment of the present disclosure, the first network device is a serving base station, a serving distributed unit DU or a serving centralized unit CU of the first terminal.

In order to achieve the above objective, an embodiment of the present disclosure provides a terminal, being a first terminal, including: a first receiving module, configured to receive sidelink radio bearer (SLRB) configuration information transmitted by a second terminal; a processing module, configured to transmit assistance information to a first network device serving the first terminal and/or determining whether to allow to establish the target SLRB according to the SLRB configuration information.

In an embodiment of the present disclosure, the terminal further includes: a first transmitting module, configured to, when the determination result is that the target SLRB is allowed to be established, transmit the assistance information to the first network device or a protocol layer of the first terminal responsible for SLRB configuration information management; a second transmitting module, configured to, when the determination result is that the target SLRB is allowed to be established, transmit a first response message to the second terminal, wherein the first response message is used to indicate that the target SLRB is successfully configured, or when the determination result is that the target SLRB is refused to be established, transmit a second response message to the second terminal, wherein the second response message is used to indicate that the target SLRB is not successfully configured.

In an embodiment of the present disclosure, the assistance information includes at least one of the following: radio bearer identification (ID) of the target SLRB; logical channel ID of the target SLRB; part or all of the SLRB configurations transmitted by the first terminal.

In an embodiment of the present disclosure, the first terminal is on the network and in a radio resource control (RRC) idle or inactive state, or the first terminal is off the network; the terminal further includes: a first configuration module, configured to perform, by the protocol layer of the first terminal responsible for SLRB configuration information management, SLRB configuration on the SLRB of the first terminal according to the assistance information.

In an embodiment of the present disclosure, the first configuration module includes: a first configuration unit, configured to, when performing the SLRB configuration on the target SLRB corresponding to the assistance information, configure the SLRB configuration information of the SLRB of the first terminal to be the same as the SLRB configuration information of the target SLRB; a second configuration unit, configured to, when performing configuration on other SLRBs other than the target SLRB corresponding to the assistance information and belonging to the sidelink formed by the first terminal and the second terminal, configure a logical channel ID included in the SLRB configuration information of the other SLRBs to be different from the logical channel ID included in the SLRB configuration information of the target SLRB; a third configuration unit, configured to, when performing configuration on other SLRBs other than the target SLRB corresponding to the assistance information and belonging to the sidelink formed by the first terminal and the second terminal and having a same source ID and a same target ID as the target SLRB, configure a logical channel ID included in the SLRB configuration information of the other SLRBs to be different from the logical channel ID included in the SLRB configuration information of the target SLRB; a fourth configuration unit, configured to, when the logical channel ID included in the SLRB configuration information of the other SLRBs other than the target SLRB corresponding to the assistance information and belonging to the sidelink formed by the first terminal and the second terminal is the same as the logical channel ID included in the SLRB configuration information of the target SLRB, update the logical channel ID of the other SLRBs to be different from the logical channel ID included in the SLRB configuration information of the target SLRB; a fifth configuration unit, configured to, when the logical channel ID included in the SLRB configuration information of the other SLRBs other than the target SLRB corresponding to the assistance information and belonging to the sidelink formed by the first terminal and the second terminal and having the same source ID and the same target ID as the target SLRB is the same as the logical channel ID included in the SLRB configuration information of the target SLRB, update the logical channel ID of the other SLRBs to be different from the logical channel ID included in the SLRB configuration information of the target SLRB.

In order to achieve the above objective, an embodiment of the present disclosure provides a network device includes: a transceiver, a memory, a processor, and a program stored in the memory and executed by the processor, the processor reads the program in the memory and executes the following process: the transceiver is configured to receive assistance information transmitted by a first terminal; the processor is configured to perform SLRB configuration on SLRB of the first terminal according to the assistance information; and/or, determine whether a target SLRB is allowed to be established according to the assistance information.

In an embodiment of the present disclosure, the assistance information includes at least one of the following: radio bearer identification (ID) of the target SLRB; logical channel ID of the target SLRB; part or all of the SLRB configurations transmitted by the first terminal.

In an embodiment of the present disclosure, the processor is further configured to: generate indication information according to the determination result, wherein the indication information is used to indicate whether the first terminal allows to establish the target SLRB and/or indicate the first terminal to use part or all of the SLRB configuration information used by the target SLRB to transmit data.

In an embodiment of the present disclosure, the processor is further configured to: when performing the SLRB configuration on the target SLRB corresponding to the assistance information, configure the SLRB configuration information of the SLRB of the first terminal to be the same as the SLRB configuration information of the target SLRB; when performing configuration on other SLRBs other than the target SLRB corresponding to the assistance information and belonging to the sidelink formed by the first terminal and the second terminal, configure a logical channel ID included in the SLRB configuration information of the other SLRBs to be different from the logical channel ID included in the SLRB configuration information of the target SLRB; when performing configuration on other SLRBs other than the target SLRB corresponding to the assistance information and belonging to the sidelink formed by the first terminal and the second terminal and having a same source ID and a same target ID as the target SLRB, configure a logical channel ID included in the SLRB configuration information of the other SLRBs to be different from the logical channel ID included in the SLRB configuration information of the target SLRB; when the logical channel ID included in the SLRB configuration information of the other SLRBs other than the target SLRB corresponding to the assistance information and belonging to the sidelink formed by the first terminal and the second terminal is the same as the logical channel ID included in the SLRB configuration information of the target SLRB, update the logical channel ID of the other SLRBs to be different from the logical channel ID included in the SLRB configuration information of the target SLRB; when the logical channel ID included in the SLRB configuration information of the other SLRBs other than the target SLRB corresponding to the assistance information and belonging to the sidelink formed by the first terminal and the second terminal and having the same source ID and the same target ID as the target SLRB is the same as the logical channel ID included in the SLRB configuration information of the target SLRB, update the logical channel ID of the other SLRBs to be different from the logical channel ID included in the SLRB configuration information of the target SLRB.

In an embodiment of the present disclosure, the SLRB configuration information includes at least one of the following: source ID; target ID; transmission type ID; SLRB ID; service data adaptation protocol layer configuration information; packet data convergence protocol layer configuration information; radio link control layer configuration information; media access control layer configuration information; physical layer configuration information.

In order to achieve the above objective, an embodiment of the present disclosure provides a network device, being a first network device, including: a second receiving module, configured to receive assistance information transmitted by a first terminal; a second configuration module, configured to perform SLRB configuration on SLRB of the first terminal according to the assistance information; and/or, a determination module, configured to determine whether a target SLRB is allowed to be established according to the assistance information.

In an embodiment of the present disclosure, the assistance information includes at least one of the following: radio bearer identification (ID) of the target SLRB; logical channel ID of the target SLRB; part or all of the SLRB configurations transmitted by the first terminal.

In an embodiment of the present disclosure, the network device further includes: an information generating module, configured to generate indication information according to the determination result, wherein the indication information is used to indicate whether the first terminal allows to establish the target SLRB and/or indicate the first terminal to use part or all of the SLRB configuration information used by the target SLRB to transmit data.

In an embodiment of the present disclosure, the second configuration module includes: a sixth configuration unit, configured to, when performing the SLRB configuration on the target SLRB corresponding to the assistance information, configure the SLRB configuration information of the SLRB of the first terminal to be the same as the SLRB configuration information of the target SLRB; a seventh configuration unit, configured to, when performing configuration on other SLRBs other than the target SLRB corresponding to the assistance information and belonging to the sidelink formed by the first terminal and the second terminal, configure a logical channel ID included in the SLRB configuration information of the other SLRBs to be different from the logical channel ID included in the SLRB configuration information of the target SLRB; an eighth configuration unit, configured to, when performing configuration on other SLRBs other than the target SLRB corresponding to the assistance information and belonging to the sidelink formed by the first terminal and the second terminal and having a same source ID and a same target ID as the target SLRB, configure a logical channel ID included in the SLRB configuration information of the other SLRBs to be different from the logical channel ID included in the SLRB configuration information of the target SLRB; a ninth configuration unit, configured to, when the logical channel ID included in the SLRB configuration information of the other SLRBs other than the target SLRB corresponding to the assistance information and belonging to the sidelink formed by the first terminal and the second terminal is the same as the logical channel ID included in the SLRB configuration information of the target SLRB, update the logical channel ID of the other SLRBs to be different from the logical channel ID included in the SLRB configuration information of the target SLRB; a tenth configuration unit, configured to, when the logical channel ID included in the SLRB configuration information of the other SLRBs other than the target SLRB corresponding to the assistance information and belonging to the sidelink formed by the first terminal and the second terminal and having the same source ID and the same target ID as the target SLRB is the same as the logical channel ID included in the SLRB configuration information of the target SLRB, update the logical channel ID of the other SLRBs to be different from the logical channel ID included in the SLRB configuration information of the target SLRB.

In order to achieve the above objective, an embodiment of the present disclosure provides a terminal, being a second terminal, comprising: a transceiver, a memory, a processor, and a program stored on the memory and executed by the processor; wherein the transceiver is configured to transmit SLRB configuration information to a first terminal.

In an embodiment of the present disclosure, the transceiver is further configured to: receive a first response message transmitted by the first terminal, wherein the first response message is used to indicate that the target SLRB is successfully configured; or, receive a second response message transmitted by the first terminal, wherein the second response message is used to indicate that the target SLRB is not successfully configured.

In an embodiment of the present disclosure, the second response message carries at least one of the following information: being empty; a reason that the target SLRB is not successfully configured; first indication information of part or all of logical channel IDs currently occupied by the first terminal on the sidelink formed by the first terminal and the second terminal; second indication information of part or all of the logical channel IDs currently occupied by the first terminal in a logical channel ID set corresponding to combination of the source ID and the target ID corresponding to the target SLRB on the sidelink formed by the first terminal and the second terminal; third indication information of all or part of the logical channel IDs currently available by the first terminal on the sidelink formed by the first terminal and the second terminal; fourth indication information of part or all of the logical channel IDs currently available by the first terminal in the logical channel ID set corresponding to the combination of the source ID and the target ID corresponding to the target SLRB on the sidelink formed by the first terminal and the second terminal.

In an embodiment of the present disclosure, the transceiver is further configured to: transmit, to a second network device or a protocol layer of the second terminal responsible for SLRB configuration information management, request information for requesting to change the SLRB configuration information of the target SLRB.

In an embodiment of the present disclosure, the request information carries at least one of the following information: first indication information of part or all of logical channel IDs currently occupied by the first terminal on the sidelink formed by the first terminal and the second terminal; second indication information of part or all of the logical channel IDs currently occupied by the first terminal in a logical channel ID set corresponding to combination of the source ID and the target ID corresponding to the target SLRB on the sidelink formed by the first terminal and the second terminal; third indication information of all or part of the logical channel IDs currently available by the first terminal on the sidelink formed by the first terminal and the second terminal; fourth indication information of part or all of the logical channel IDs currently available by the first terminal in the logical channel ID set corresponding to the combination of the source ID and the target ID corresponding to the target SLRB on the sidelink formed by the first terminal and the second terminal.

In an embodiment of the present disclosure, the second terminal is on the network and in an RRC idle state or inactive state, or the second terminal is off the network; and the processor is configured to: according to the request information, update a logical channel ID included in the SLRB configuration information of the target SLRB to make it different from a logical channel ID included in the SLRB configuration information of another SLRB currently being established or having been established between the first terminal and the second terminal; or, according to the request information, update the logical channel ID included in the SLRB configuration information of the target SLRB to make it different from a logical channel ID included in the SLRB configuration information of another SLRB currently being established or having been established between the first terminal and the second terminal and using a same source ID and a same target ID as the target SLRB.

In an embodiment of the present disclosure, the protocol layer responsible for SLRB configuration information management is an RRC protocol layer.

In an embodiment of the present disclosure, the second network device is a serving base station, a serving distributed unit DU, or a serving centralized unit CU of the second terminal.

In order to achieve the above objective, an embodiment of the present disclosure provides a terminal, including: a third transmitting module, configured to transmit SLRB configuration information to a first terminal.

In an embodiment of the present disclosure, the terminal further includes: a third receiving module, configured to receive a first response message transmitted by the first terminal, wherein the first response message is used to indicate that the target SLRB is successfully configured; or receive a second response message transmitted by the first terminal, wherein the second response message is used to indicate that the target SLRB is not successfully configured.

In an embodiment of the present disclosure, the second response message carries at least one of the following information: being empty; a reason that the target SLRB is not successfully configured; first indication information of part or all of logical channel IDs currently occupied by the first terminal on the sidelink formed by the first terminal and the second terminal; second indication information of part or all of the logical channel IDs currently occupied by the first terminal in a logical channel ID set corresponding to combination of the source ID and the target ID corresponding to the target SLRB on the sidelink formed by the first terminal and the second terminal; third indication information of all or part of the logical channel IDs currently available by the first terminal on the sidelink formed by the first terminal and the second terminal; fourth indication information of part or all of the logical channel IDs currently available by the first terminal in the logical channel ID set corresponding to the combination of the source ID and the target ID corresponding to the target SLRB on the sidelink formed by the first terminal and the second terminal.

In an embodiment of the present disclosure, the terminal further includes: a fourth transmitting module, configured to transmit, to a second network device or a protocol layer of the second terminal responsible for SLRB configuration information management, request information for requesting to change the SLRB configuration information of the target SLRB.

In an embodiment of the present disclosure, the request information carries at least one of the following information: first indication information of part or all of logical channel IDs currently occupied by the first terminal on the sidelink formed by the first terminal and the second terminal; second indication information of part or all of the logical channel IDs currently occupied by the first terminal in a logical channel ID set corresponding to combination of the source ID and the target ID corresponding to the target SLRB on the sidelink formed by the first terminal and the second terminal; third indication information of all or part of the logical channel IDs currently available by the first terminal on the sidelink formed by the first terminal and the second terminal; fourth indication information of part or all of the logical channel IDs currently available by the first terminal in the logical channel ID set corresponding to the combination of the source ID and the target ID corresponding to the target SLRB on the sidelink formed by the first terminal and the second terminal.

In order to achieve the above objective, an embodiment of the present disclosure provides a network device, including: a transceiver, a memory, a processor, and a program stored in the memory and executed by the processor, the processor reads the program in the memory and executes the following process: the transceiver is configured to receive request information for changing SLRB configuration information of a target SLRB transmitted by a second terminal, wherein the SLRB configuration information of the target SLRB is SLRB configuration information of the target SLRB transmitted by the second terminal to a first terminal through a sidelink interface; the processor is configured to, according to the request information, update a logical channel ID included in the SLRB configuration information of the target SLRB to make it different from a logical channel ID included in the SLRB configuration information of another SLRB currently being established or having been established between the first terminal and the second terminal; or according to the request information, update the logical channel ID included in the SLRB configuration information of the target SLRB to make it different from a logical channel ID included in the SLRB configuration information of another SLRB currently being established or having been established between the first terminal and the second terminal and using a same source ID and a same target ID as the target SLRB.

In order to achieve the above objective, an embodiment of the present disclosure provides a network device, being a second network device, including: a fourth receiving module, configured to receive request information for changing SLRB configuration information of a target SLRB transmitted by a second terminal, wherein the SLRB configuration information of the target SLRB is SLRB configuration information of the target SLRB transmitted by the second terminal to a first terminal through a sidelink interface; a second configuration update module, configured to, according to the request information, update a logical channel ID included in the SLRB configuration information of the target SLRB to make it different from a logical channel ID included in the SLRB configuration information of another SLRB currently being established or having been established between the first terminal and the second terminal; or according to the request information, update the logical channel ID included in the SLRB configuration information of the target SLRB to make it different from a logical channel ID included in the SLRB configuration information of another SLRB currently being established or having been established between the first terminal and the second terminal and using a same source ID and a same target ID as the target SLRB.

In order to achieve the above objective, an embodiment of the present disclosure provides a computer-readable storage medium with a computer program stored thereon, wherein the program is executed by a processor to implement the sidelink interface wireless bearer configuration method.

The beneficial effect of the above technical solutions are as follows.

In the above solution of an embodiment of the present disclosure, the SLRB configuration information of the target radio bearer SLRB of the sidelink interface transmitted by the second terminal is received; according to the SLRB configuration information, assistance information is transmitted to the first network serving the first terminal and/or it is determined whether the target SLRB is allowed to be established. In this way, the first network device or the first terminal itself determines the configuration conflict of the received SLRB configuration information transmitted by the second terminal through the sidelink interface, the conflict between the transmitting terminal and receiving terminal in the sidelink communication on SLRB configuration of the same SLRB may be avoided, and the conflict among different SLRBs of the same terminal on the SLRB configuration may be avoided.

BRIEF DESCRIPTION OF THE DRAWINGS

FIG. 5 is yet another schematic flowchart of the sidelink interface radio bearer configuration method according to an embodiment of the present disclosure;

FIG. 6 is another specific flowchart of an application of the sidelink interface radio bearer configuration method between the first terminal and the second terminal according to an embodiment of the present disclosure;

DETAILED DESCRIPTION

In order to make the technical problem, technical solution, and advantage to be solved by the present disclosure clearer, a detailed description will be given below in conjunction with the accompanying drawings and specific embodiments.

Figure 1:
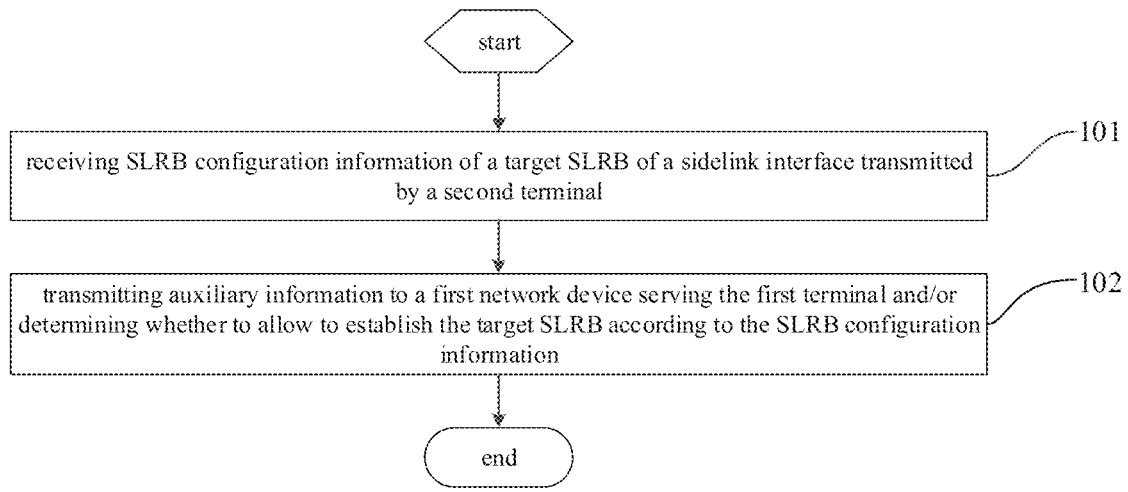
FIG. 1 is a schematic flowchart of a sidelink interface radio bearer configuration method according to an embodiment of the present disclosure.

As shown in FIG. 1, it is a schematic flowchart of a sidelink interface radio bearer configuration method provided by an embodiment of the present disclosure, which is applied to a first terminal and includes:

Step 101: Receiving SLRB configuration information of a target radio bearer SLRB of a sidelink interface transmitted by a second terminal;

In this step, optionally, the SLRB configuration information includes at least one of the following:

Source ID;
Target ID;
Transmission type ID;
SLRB ID;
Service data adaptation protocol layer configuration information;
Packet data convergence protocol layer configuration information;
Radio link control layer configuration information;
Media access control layer configuration information;
Physical layer configuration information.

Here, optionally, the source ID may specifically be a source L2 ID.

Optionally, the target ID may specifically be a destination L2 ID.

The transmission type ID may include, but is not limited to: unicast ID, multicast ID, or broadcast ID.

Packet Data Convergence Protocol (PDCP) layer configuration information may include whether to support header compression.

RLC layer configuration information may include an RLC mode, LCID, and so on.

Media Access Control (MAC) layer configuration information may include: SLRB prioritization, Logical Channel Prioritization (LCP) related parameters, etc.

Step 102: transmitting assistance information to a first network device serving a first terminal and/or determining whether to allow to establish a target SLRB according to the SLRB configuration information.

In this step, according to the SLRB configuration information, the assistance information is transmitted to the first network device serving the first terminal, so as to enable the first network device to perform SLRB configuration on the SLRB of the first terminal and/or determine whether the target SLRB is allowed to be established according to the assistance information transmitted by the first terminal. Since this assistance information is based on the SLRB configuration information, when performing the SLRB configuration and/or determining whether the target SLRB is allowed to be established, the conflict between the transmitting terminal and receiving terminal in the sidelink communication on SLRB configuration of the same SLRB may be avoided, and the conflict among different SLRBs of the same terminal on the SLRB configuration may be avoided.

Optionally, the assistance information includes at least one of the following:

Radio bearer identification (ID) of the target SLRB;
Logical channel ID of the target SLRB;
Part or all of the SLRB configurations transmitted by the first terminal.

Optionally, in this step, determining whether the target SLRB is allowed to be established according to the SLRB configuration information may specifically include the following steps:

Determining whether a logical channel ID included in SLRB configuration information corresponding to the target SLRB currently being established between the first terminal and the second terminal is the same as a logical channel ID included in SLRB configuration information corresponding to another SLRB that has been established or is being established between the first terminal and the second terminal; or, Determining whether the logical channel ID included in the SLRB configuration information corresponding to the target SLRB currently being established between the first terminal and the second terminal is the same as a logical channel ID included in SLRB configuration information corresponding to another SLRB that has been established or is being established between the first terminal and the second terminal and has the same source ID and destination ID as the target SLRB; or, Determining whether a radio bearer ID included in SLRB configuration information corresponding to the target SLRB currently being established between the first terminal and the second terminal is the same as a radio bearer ID included in SLRB configuration information corresponding to another SLRB that has been established or is being established between the first terminal and the second terminal; or, Determining whether the radio bearer ID included in the SLRB configuration information corresponding to the target SLRB currently being established between the first terminal and the second terminal is the same as a radio bearer ID included in SLRB configuration information corresponding to another SLRB that has been established or is being established between the first terminal and the second terminal and has the same source ID and destination ID as the target SLRB; or, When the determination result is not the same, allowing to establish the target SLRB; or, When the determination result is the same and meet a target condition, allowing to establish the target SLRB;

Otherwise, refusing to establish the target SLRB.

Here, it should be noted that, according to the above determining steps, when the determination result is not the same, it means that there is no configuration conflict between the SLRB configuration information corresponding to the target SLRB and the SLRB configuration information corresponding to another SLRB that has been established or is being established between the first terminal and the second terminal, or it means that there is no configuration conflict between the SLRB configuration information corresponding to the target SLRB and the SLRB configuration information corresponding to another SLRB that has been established or is being established between the first terminal and the second terminal and has the same source ID and destination ID as the target SLRB.

According to the above determining steps, when the determination result is the same, it means that there is a configuration conflict between the SLRB configuration information corresponding to the target SLRB and the SLRB configuration information corresponding to another SLRB that has been established or is being established between the first terminal and the second terminal, or it means that there is a configuration conflict between the SLRB configuration information corresponding to the target SLRB and the SLRB configuration information corresponding to another SLRB that has been established or is being established between the first terminal and the second terminal and has the same source ID and destination ID as the target SLRB. However, when there is a configuration conflict, it does not necessarily mean that the target SLRB is refused to be established. It can also be further determined whether the target condition is met. When the target condition is met, the target SLRB is allowed to be established; otherwise, the target SLRB is refused to be established.

Here, optionally, the target condition includes at least one of the following:

A QoS parameter of the target SLRB being higher than a QoS parameter of another SLRB currently being established between the first terminal and the second terminal and using a same logic channel ID or a same radio bearer ID as the target SLRB;

The QoS parameter of the target SLRB being higher than a QoS parameter of another SLRB currently being established between the first terminal and the second terminal and using a same source ID, a same destination ID and a same logic channel ID or using a same source ID, a same destination ID and a same radio bearer ID as the target SLRB;

The QoS parameter of the target SLRB being higher than a QoS parameter of another SLRB currently having been established between the first terminal and the second terminal and using a same logic channel ID or a same radio bearer ID as the target SLRB;

The QoS parameter of the target SLRB being higher than a QoS parameter of another SLRB currently having been established between the first terminal and the second terminal and using a same source ID, a same destination ID and a same logic channel ID or using a same source ID, a same destination ID and a same radio bearer ID as the target SLRB;

A priority of the second terminal that initiates the establishment of the target SLRB being higher than a priority of a terminal that initiates the establishment of the other SLRB that uses the same logical channel ID or the same radio bearer ID as the target SLRB;

An initiation time of the target SLRB being earlier than an initiation time of the other SLRB that uses the same logical channel ID or the same radio bearer ID as the target SLRB.

It should be noted that the QoS parameters of the SLRB may include, but are not limited to, a priority and a delay requirement of the SLRB.

It should be noted that the priority of the second terminal that initiates the establishment of the target SLRB is higher than the priority of the terminal that initiates the establishment of the other SLRB that uses the same logical channel ID as the target SLRB; an example can be illustrated as follows.

For example, when the second terminal that initiates the establishment of the target SLRB is a group head, the priority thereof is higher than the priority of a group member terminal that initiates the establishment of the other SLRB that uses the same logical channel ID as the target SLRB.

In the sidelink interface radio bearer configuration method according to an embodiment of the present disclosure, the SLRB configuration information of the target radio bearer SLRB of the sidelink interface transmitted by the second terminal is received; according to the SLRB configuration information, assistance information is transmitted to the first network serving the first terminal and/or it is determined whether the target SLRB is allowed to be established. In this way, the first network device or the first terminal itself determines the configuration conflict of the received SLRB configuration information transmitted by the second terminal through the sidelink interface, the conflict between the transmitting terminal and receiving terminal in the sidelink communication on SLRB configuration of the same SLRB may be avoided, and the conflict among different SLRBs of the same terminal on the SLRB configuration may be avoided.

Based on the embodiment shown in FIG. 1, as an optional implementation, after step 102, the method may further include:

In a case that the determination result is that the target SLRB is allowed to be established, transmitting assistance information to the first network device or a protocol layer of the first terminal responsible for SLRB configuration information management;

Optionally, the first network device is a serving base station, a serving distributed unit DU, or a serving centralized unit CU of the first terminal.

Optionally, the protocol layer responsible for SLRB configuration information management is a radio resource control RRC protocol layer. That is, in this embodiment, the protocol layer of the first terminal responsible for SLRB configuration information management is the RRC layer of the first terminal.

It should be noted that, when the first terminal is on the network and in the RRC connected state, when the determination result is that the target SLRB is allowed to be established, the assistance information is transmitted to the first network device;

When the first terminal is on the network and in the RRC idle or inactive state, or the first terminal is in the offline state, when the determination result is that the target SLRB is allowed to be established, the assistance information is transmitted to the protocol layer of the first terminal responsible for SLRB configuration information management.

When the determination result is that the target SLRB is allowed to be established, a first response message is transmitted to the second terminal, wherein the first response message is used to indicate that the target SLRB is successfully configured. When the determination result is that the target SLRB is refused to be established, the second response message is transmitted to the second terminal, wherein the second response message is used to indicate that the target SLRB is not successfully configured.

Optionally, the assistance information includes at least one of the following:
  Radio bearer identification (ID) of the target SLRB;
  The logical channel ID of the target SLRB;
  Part or all of the SLRB configurations transmitted by the first terminal.

Optionally, the second response message carries at least one of the following information:
  Being empty;
  A reason that the target SLRB is not successfully configured;
  First indication information of part or all of logical channel IDs currently occupied by the first terminal on the sidelink formed by the first terminal and the second terminal;
  Second indication information of part or all of the logical channel IDs currently occupied by the first terminal in the logical channel ID set corresponding to combination of the source ID and the target ID corresponding to the target SLRB on the sidelink formed by the first terminal and the second terminal;
  Third indication information of all or part of the logical channel IDs currently available by the first terminal on the sidelink formed by the first terminal and the second terminal;
  Fourth indication information of part or all of the logical channel IDs currently available by the first terminal in the logical channel ID set corresponding to the combination of the source ID and the target ID corresponding to the target SLRB on the sidelink formed by the first terminal and the second terminal.

Here, the logical channel ID set includes at least two logical channel IDs, that is, includes two or more logical channel IDs.

As an optional implementation, the first terminal is on the network and in a radio resource control idle state or inactive state, or the first terminal is off the network; when the determination result is that the target SLRB is allowed to be established, after transmitting assistance information to the protocol layer responsible for SLRB configuration information management of the first terminal, the method further includes:

performing SLRB configuration on the SLRB of the first terminal by the protocol layer of the first terminal responsible for the SLRB configuration information management according to the assistance information.

This step may specifically include at least one of the following steps:

When performing SLRB configuration on the target SLRB corresponding to the assistance information, configuring the SLRB configuration information of the SLRB of the first terminal to be the same as the SLRB configuration information of the target SLRB;

Here, that is to say, when the protocol layer of the first terminal responsible for SLRB configuration information management performs SLRB configuration on the target SLRB corresponding to the assistance information, it needs to ensure that the SLRB configuration of the SLRB of the first terminal and the SLRB configuration information of the target SLRB included in the assistance information are exactly the same. In this way, it is possible to avoid the conflict of the SLRB configuration on the same SLRB by the transmitting terminal and receiving terminal of the sidelink communication.

For example, when the protocol layer of the first terminal responsible for the SLRB configuration information management decides to map a QoS flow to the target SLRB, the configuration of the SLRB needs to be completely consistent with that of the SLRB configuration received by the first terminal from the second terminal.

When performing configuration on other SLRBs other than the target SLRB corresponding to the assistance information and belonging to the sidelink formed by the first terminal and the second terminal, configuring a logical channel ID included in the SLRB configuration information of the other SLRBs to be different from the logical channel ID included in the SLRB configuration information of the target SLRB;

Here, that is to say, when the protocol layer of the first terminal responsible for SLRB configuration information management perform configuration on other SLRBs other than the target SLRB corresponding to the assistance information and belonging to the sidelink formed by the first terminal and the second terminal, it is necessary to ensure that the Logical Channel ID (LCID) already included in the assistance information is not configured. In this way, it is possible to avoid SLRB configuration conflicts between different SLRBs of the same terminal.

For example, when the protocol layer of the first terminal responsible for the SLRB configuration information management decides to map a QoS flow to other SLRBs other than the target SLRB, an LCID that is the same as the target SLRB cannot be used for other SLRBs belonging to the sidelink formed by the first terminal and the second terminal.

When performing configuration on other SLRBs other than the target SLRB corresponding to the assistance information and belonging to the sidelink formed by the first terminal and the second terminal and having the same source ID and the same target ID as the target SLRB, configuring a logical channel ID included in the SLRB configuration information of the other SLRBs to be different from the logical channel ID included in the SLRB configuration information of the target SLRB;

For example, when the protocol layer of the first terminal responsible for the SLRB configuration information management decides to map a QoS flow to other SLRBs other than the target SLRB, an LCD that is the same as the target SLRB cannot be used for other SLRBs belonging to the sidelink formed by the first terminal and the second terminal and having the same source ID and the same target ID as the target SLRB.

When the logical channel ID included in the SLRB configuration information of other SLRBs other than the target SLRB corresponding to the assistance information and belonging to the sidelink formed by the first terminal and the second terminal is the same as the logical channel ID included in the SLRB configuration information of the target SLRB, updating the logical channel IDs of the other SLRBs to be different from the logical channel ID included in the SLRB configuration information of the target SLRB.

Here, that is to say, when the protocol layer of the first terminal responsible for SLRB configuration information management has performed SLRB configuration on other SLRBs other than the target SLRB corresponding to the assistance information and belonging to the sidelink formed by the first terminal and the second terminal, and the logical channel ID included in the configured SLRB configuration information is the same as the logical channel ID included in the SLRB configuration information of the target SLRB, then changing the logic channel IDs of the other SLRBs to be different from the logical channel ID included in the SLRB configuration information of the target SLRB. In this way, configuration conflicts among different SLRBs of the same terminal can be avoided.

When the logical channel ID included in the SLRB configuration information of other SLRBs other than the target SLRB corresponding to the assistance information and belonging to the sidelink formed by the first terminal and the second terminal and having the same source ID and the same target ID as the target SLRB is the same as the logical channel ID included in the SLRB configuration information of the target SLRB, updating the logical channel IDs of the other SLRBs to be different from the logical channel ID included in the SLRB configuration information of the target SLRB.

Figure 2:
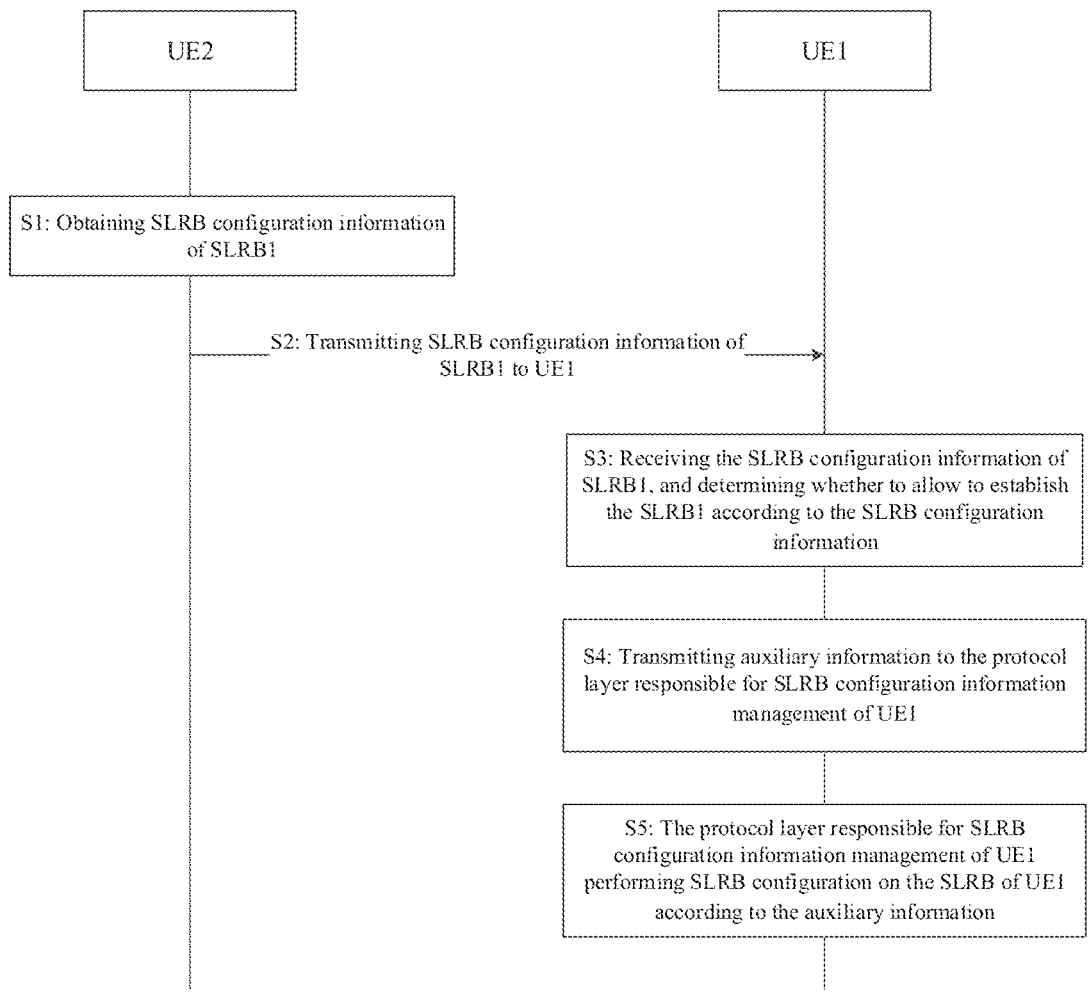
FIG. 2 is a specific flowchart of an application of the sidelink interface radio bearer configuration method between the first terminal and the second terminal according to an embodiment of the present disclosure.

In the following, as shown in FIG. 2, the specific implementation process of the sidelink interface radio bearer configuration method of the present disclosure will be described in detail with reference to Example 1.

In this example, User Equipment (UE) 1 and UE2 are two terminals that communicate through a sidelink interface. UE1 is on the network and in the RRC idle state or RRC inactive state, or UE1 is off the network. The specific steps are described as follows:

S1: Obtaining SLRB configuration information of SLRB1;

Here, UE2 obtains the configuration information of SLRB1. The SLRB1 (that is, the target SLRB described in the foregoing embodiment) is any bearer used between UE1 and UE2. For example, the SLRB1 may be one of the following SLRBs:

Bi-directional SLRB of RLC AM;
Bi-directional SLRB of RLC UM (Un-acknowledge Mode);
SLRB of unidirectional RLC UM;
SLRB of unidirectional RLC TM (Transparent Mode).

Specifically, UE2 may obtain SLRB configuration information corresponding to SLRB 1 according to the current RRC state of UE2. Among them, the specific obtaining method is as follows:

1) When UE2 is on the network and in the RRC connected state, UE2 requests the SLRB configuration information corresponding to the QoS flow from the network through RRC signaling;
2) When UE2 is on the network and in the RRC idle state or RRC inactive state, UE2 obtains the SLRB configuration information corresponding to the QoS flow through the SIB;
3) When UE2 is off the network, UE2 obtains the SLRB configuration information corresponding to the QoS flow through pre-configuration information.

S2: Transmitting SLRB configuration information of SLRB1 to UE1;

In this step, UE2 transmits SLRB configuration information of SLRB 1 to UE1.

Optionally, UE2 transmits the SLRB configuration information of SLRB1 to UE1 through the sidelink interface signaling bearer.

S3: Receiving the SLRB configuration information of SLRB1, and determining whether to allow to establish the SLRB1 according to the SLRB configuration information;

The subject of execution in this step is UE1, and UE1 determining whether to allow to establish the SLRB1 according to the SLRB configuration information is as follows:

The UE1 determines whether there is a conflict between the LCID included in the received SLRB configuration information of the SLRB 1 and the LCID configuration included in the SLRB configuration information of other SLRBs currently being established or having been established between the UE1 and the UE2.

Here, specifically, UE1 determines whether the LCID included in the configuration information of SLRB1 is the same as the LCID configuration in the SLRB configuration information of other SLRBs currently being established or having been established between UE1 and UE2, or UE1 determines whether LCID included in the configuration information of SLRB1 is the same as the LCID configuration in the SLRB configuration information of other SLRBs currently being established or having been established between UE1 and UE2 and having the same source ID and the same target ID as the target SLRB;

When the determination result is the same, it means there is a conflict; otherwise, it means there is no conflict.

When there is a conflict, according to a specific principle, it is determined which SLRB needs to be refused among the plurality SLRBs among which there is a conflict. The refusing the SLRB here includes: refusing to establish an SLRB or releasing an established SLRB.

Specific principles can include but are not limited to at least one of the following:

According to the QoS parameter of SLRB, such as the priority and/or the delay requirement;
According to a priority of the UE that initiated the establishment of the SLRB, for example, the UE that initiated the establishment of the SLRB is the group head, then it has priority;
According to the SLRB initiation time, for example, when the SLRB initiation time is earlier, it has priority.

When it is determined in step S3 that the SLRB1 is allowed to be established, then continue to execute S4.

S4: Transmitting assistance information to the protocol layer responsible for SLRB configuration information management of UE1;

Optionally, the SLRB configuration information management protocol layer of UE1 is the RRC layer of UE1.

Here, the assistance information is all or part of the SLRB configuration information of the SLRB1 received by the UE1.

Wherein, the SLRB configuration information of SLRB1 includes at least one of the following:

Source L2 ID;
Destination L2 ID;
Transmission type ID;
SLRB ID;
SDAP layer configuration information;
PDCP layer configuration information;
RLC layer configuration information;
MAC layer configuration information;
Physical Layer (PHY) configuration information.

It should be noted that before transmitting the assistance information to the protocol layer responsible for the SLRB configuration information management of the UE1, the assistance information needs to be determined, which may specifically include:

When UE1 and UE2 perform the SLRB configuration for the same SLRB for the transmitting terminal and the receiving terminal in the unicast sidelink communication, the assistance information includes all of the SLRB configuration information of SLRB1;

When UE1 and UE2 perform the SLRB configuration for different SLRBs for the transmitting terminal and the receiving terminal in the sidelink communication, the assistance information includes part of the SLRB configuration information of SLRB1. Optionally, the assistance information includes the source L2 ID, the target L2 ID, and the LCID; or, the assistance information includes Source L2 ID and LCD.

S5: The protocol layer responsible for SLRB configuration information management of UE1 performing SLRB configuration on the SLRB of UE1 according to the assistance information;

Since UE1 is on the network and in the RRC idle state or RRC inactive state, or UE1 is off the network, the protocol layer responsible for SLRB configuration information management of UE1 is the RRC layer of UE1.

The protocol layer responsible for SLRB configuration information management performs a more reasonable SLRB configuration on the SLRB of UE1 according to the assistance information, which specifically includes:

When the protocol layer responsible for the SLRB configuration information management performs SLRB configuration on the SLRB1 corresponding to the assistance information, the SLRB configuration is exactly the same as the SLRB configuration information of the SLRB1 provided in the assistance information.

For example, when the protocol layer responsible for SLRB configuration information management decides to map a QoS flow to SLRB 1, then the configuration of the SLRB must be exactly the same as the SLRB configuration of SLRB 1 received by UE1 from UE2.

When the protocol layer responsible for SLRB configuration information management performs SLRB configuration on other SLRBs other than the SLRB1 corresponding to the assistance information and belonging to the sidelink formed by UE1 and UE2, then the LCID of the other SLRBs is different from the LCID in the SLRB configuration information of SLRB1 provided in the assistance information.

For example, when the protocol layer responsible for SLRB configuration information management decides to map a QoS flow to other SLRBs other than SLRB 1, then the SLRB that belongs to the same Source L2 ID and Destination L2 ID as SLRB 1 cannot use the same LCID as the SLRB1.

When the protocol layer responsible for SLRB configuration information management perform configuration on other SLRBs other than the SLRB1 corresponding to the assistance information and belonging to the sidelink formed by UE1 and UE2, and having the same source ID and the same target ID as the target SLRB, the configured LCID of other SLRBs is different from the LCID in the SLRB configuration information of SLRB1 provided by the assistance information.

When there is a conflict between the LCID in the SLRB1 configuration information and the LCID allocated by the protocol layer responsible for SLRB configuration information management for other SLRBs between UE1 and UE2, or when there is a conflict between the LCID in the SLRB1 configuration information and the LCID allocated by the protocol layer responsible for SLRB configuration information management for other SLRBs between UE1 and UE2 and having the same source ID and the same target ID as the SLRB1, so the protocol layer responsible for SLRB configuration information management needs to update the LCIDs allocated by other SLRBs.

In the sidelink interface radio bearer configuration method of an embodiment of the present disclosure, the SLRB configuration information of the target radio bearer SLRB of the sidelink interface transmitted by the second terminal is received; according to the SLRB configuration information, assistance information is transmitted to the first network device serving the first terminal and/or it is determined whether the target SLRB is allowed to be established. In this way, the first network device or the first terminal itself determines the configuration conflict of the received SLRB configuration information transmitted by the second terminal through the sidelink interface, it can avoid the SLRB configuration conflicts for the same SLRB between the transmitting terminal and receiving terminal in the sidelink communication, and at the same time the SLRB configuration conflicts among different SLRBs of the same terminal is avoided.

Figure 3:
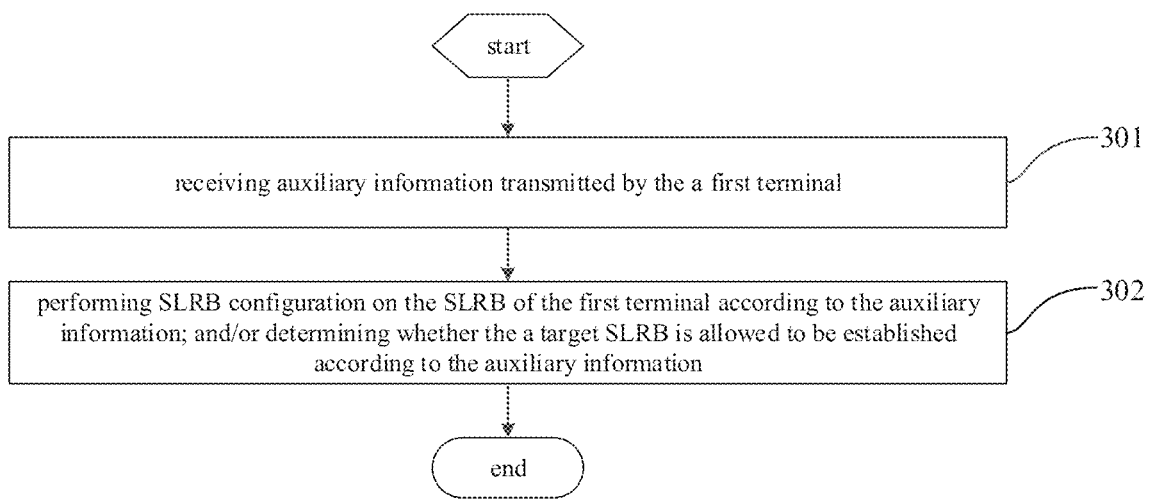
FIG. 3 is another schematic flowchart of the sidelink interface radio bearer configuration method according to an embodiment of the present disclosure.

As shown in FIG. 3, it is a schematic flowchart of a sidelink interface radio bearer configuration method provided by an embodiment of the present disclosure, which is applied to a first network device and includes:

Step 301: Receiving assistance information transmitted by a first terminal;

In this step, optionally, the first network device is the serving base station, the serving distributed unit DU or the serving centralized unit CU of the first terminal.

It should be noted that the assistance information includes: received assistance information transmitted by the first terminal according to the received SLRB configuration information of the second terminal, and/or received assistance information transmitted by the first terminal when the determination result on whether to allow to establish the target SLRB is yes.

Here, optionally, the SLRB configuration information includes at least one of the following:

Source ID;
    Target ID;
    Transmission type ID;
    SLRB ID;
    Service data adaptation protocol layer configuration information;
    Packet data convergence protocol layer configuration information;
    Radio link control layer configuration information;
    Media access control layer configuration information;
    Physical layer configuration information.

Step 302: Performing SLRB configuration on the SLRB of the first terminal according to the assistance information; and/or determining whether the target SLRB is allowed to be established according to the assistance information.

It should be explained that the steps in this embodiment correspond to the sidelink interface radio bearer configuration method in the embodiment applied in the first terminal side.

For example, on the first terminal side, step 102 of the method is to transmit an auxiliary message to the first network device serving the first terminal according to the SLRB configuration information;

That is, the step of determining whether the target SLRB is allowed to be established is not performed in the first terminal side;

Then, for a first network device serving the first terminal, such as a base station, step 302 of the method is to determine whether the target SLRB is allowed to be established according to the assistance information, and at the same time, the step of performing the SLRB configuration on the SLRB of the first terminal is performed.

For example, on the first terminal side, step 102 in the method is to determine whether the target SLRB is allowed to be established according to the SLRB configuration information;

Then, on the first network device side serving the first terminal, step 302 of the method is to perform SLRB configuration on the SLRB of the first terminal according to the assistance information.

As an optional implementation, determining whether the target SLRB is allowed to be established according to the assistance information may specifically include the following steps:

Determining whether a logical channel ID included in SLRB configuration information corresponding to the target SLRB currently being established between the first terminal and the second terminal is the same as a logical channel ID included in SLRB configuration information corresponding to another SLRB that has been established or is being established between the first terminal and the second terminal; or, Determining whether the logical channel ID included in the SLRB configuration information corresponding to the target SLRB currently being established between the first terminal and the second terminal is the same as a logical channel ID included in SLRB configuration information corresponding to another SLRB that has been established or is being established between the first terminal and the second terminal and has the same source ID and destination ID as the target SLRB; or, Determining whether a radio bearer ID included in SLRB configuration information corresponding to the target SLRB currently being established between the first terminal and the second terminal is the same as a radio bearer ID included in SLRB configuration information corresponding to another SLRB that has been established or is being established between the first terminal and the second terminal; or, Determining whether the radio bearer ID included in the SLRB configuration information corresponding to the target SLRB currently being established between the first terminal and the second terminal is the same as a radio bearer ID included in SLRB configuration information corresponding to another SLRB that has been established or is being established between the first terminal and the second terminal and has the same source ID and destination ID as the target SLRB; or, When the determination result is not the same, allowing to establish the target SLRB; or, When the determination result is the same and meet a target condition, allowing to establish the target SLRB;

Otherwise, refusing to establish the target SLRB.

Here, it should be noted that, according to the above determining steps, when the determination result is not the same, it means that there is no configuration conflict between the SLRB configuration information corresponding to the target SLRB and the SLRB configuration information corresponding to another SLRB that has been established or is being established between the first terminal and the second terminal, or it means that there is no configuration conflict between the SLRB configuration information corresponding to the target SLRB and the SLRB configuration information corresponding to another SLRB that has been established or is being established between the first terminal and the second terminal and has the same source ID and destination ID as the target SLRB.

According to the above determining steps, when the determination result is the same, it means that there is a configuration conflict between the SLRB configuration information corresponding to the target SLRB and the SLRB configuration information corresponding to another SLRB that has been established or is being established between the first terminal and the second terminal, or it means that there is a configuration conflict between the SLRB configuration information corresponding to the target SLRB and the SLRB configuration information corresponding to another SLRB that has been established or is being established between the first terminal and the second terminal and has the same source ID and destination ID as the target SLRB. However, when there is a configuration conflict, it does not necessarily mean that the target SLRB is refused to be established. It can also be further determined whether the target condition is met. When the target condition is met, the target SLRB is allowed to be established; otherwise, the target SLRB is refused to be established.

Here, optionally, the target condition includes at least one of the following:

A QoS parameter of the target SLRB being higher than a QoS parameter of another SLRB currently being established between the first terminal and the second terminal and using a same logic channel ID or a same radio bearer ID as the target SLRB;

The QoS parameter of the target SLRB being higher than a QoS parameter of another SLRB currently being established between the first terminal and the second terminal and using a same source ID, a same destination ID and a same logic channel ID or using a same source ID, a same destination ID and a same radio bearer ID as the target SLRB;

The QoS parameter of the target SLRB being higher than a QoS parameter of another SLRB currently having been established between the first terminal and the second terminal and using a same logic channel ID or a same radio bearer ID as the target SLRB;

The QoS parameter of the target SLRB being higher than a QoS parameter of another SLRB currently having been established between the first terminal and the second terminal and using a same source ID, a same destination ID and a same logic channel ID or using a same source ID, a same destination ID and a same radio bearer ID as the target SLRB;

A priority of the second terminal that initiates the establishment of the target SLRB being higher than a priority of a terminal that initiates the establishment of the other SLRB that uses the same logical channel ID or the same radio bearer ID as the target SLRB;

An initiation time of the target SLRB being earlier than an initiation time of the other SLRB that uses the same logical channel ID or the same radio bearer ID as the target SLRB.

It should be noted that the QoS parameters of the SLRB may include, but are not limited to, a priority and a delay requirement of the SLRB.

It should be noted that the priority of the second terminal that initiates the establishment of the target SLRB is higher than the priority of the terminal that initiates the establishment of the other SLRB that uses the same logical channel ID as the target SLRB; an example can be illustrated as follows.

For example, when the second terminal that initiates the establishment of the target SLRB is a group head, the priority thereof is higher than the priority of a group member terminal that initiates the establishment of the other SLRB that uses the same logical channel ID as the target SLRB.

In the sidelink interface radio bearer configuration method of the embodiment of the present disclosure, the assistance information transmitted by a first terminal is received; the SLRB configuration is performed on the SLRB of the first terminal according to the assistance information; and/or, according to the assistance information, it is determined whether the target SLRB is allowed to be established, so that the SLRB configuration conflicts for the same SLRB between the transmitting terminal and the receiving terminal in the sidelink communication is avoided, and at the same time the SLRB configuration conflicts among different SLRBs of the same terminal is avoided.

Optionally, the assistance information includes at least one of the following:

Radio bearer identification (ID) of the target SLRB;

The logical channel ID of the target SLRB;

Part or all of the SLRB configuration information used when the first terminal transmit data by using the target SLRB.

Based on the embodiment shown in FIG. 3, as an optional implementation, after determining whether the target SLRB is allowed to be established according to the assistance information in step 302, the method may further include:

Generating indication information according to the determination result, the indication information is used to indicate whether the first terminal allows to establish the target SLRB and/or indicate the first terminal to use part or all of the SLRB configuration information used by the target SLRB to transmit data.

Based on the embodiment shown in FIG. 3, as an optional implementation, performing SLRB configuration on the SLRB of the first terminal according to the assistance information in step 302 may include at least one of the following steps:

When performing SLRB configuration on the target SLRB corresponding to the assistance information, configuring the SLRB configuration information of the SLRB of the first terminal to be the same as the SLRB configuration information of the target SLRB;

Here, that is to say, when the first network device performs SLRB configuration on the target SLRB corresponding to the assistance information, it needs to ensure that the SLRB configuration of the SLRB of the first terminal and the SLRB configuration information of the target SLRB included in the assistance information are exactly the same. In this way, it is possible to avoid the conflict of the SLRB configuration on the same SLRB by the transmitting terminal and receiving terminal of the sidelink communication.

For example, when the first network device decides to map a QoS flow to the target SLRB, the configuration of the SLRB needs to be completely consistent with that of the SLRB configuration received by the first terminal from the second terminal.

When performing configuration on other SLRBs other than the target SLRB corresponding to the assistance information and belonging to the sidelink formed by the first terminal and the second terminal, configuring a logical channel ID included in the SLRB configuration information of the other SLRBs to be different from the logical channel ID included in the SLRB configuration information of the target SLRB;

Here, that is to say, when the first network device perform configuration on other SLRBs other than the target SLRB corresponding to the assistance information and belonging to the sidelink formed by the first terminal and the second terminal, it is necessary to ensure that the Logical Channel ID (LCID) already included in the assistance information is not configured. In this way, it is possible to avoid SLRB configuration conflicts between different SLRBs of the same terminal.

For example, when the first network device decides to map a QoS flow to other SLRBs other than the target SLRB, an LCID that is the same as the target SLRB cannot be used for other SLRBs belonging to the sidelink formed by the first terminal and the second terminal.

When performing configuration on other SLRBs other than the target SLRB corresponding to the assistance information and belonging to the sidelink formed by the first terminal and the second terminal and having the same source ID and the same target ID as the target SLRB, configuring a logical channel ID included in the SLRB configuration information of the other SLRBs to be different from the logical channel ID included in the SLRB configuration information of the target SLRB;

For example, when the first network device decides to map a QoS flow to other SLRBs other than the target SLRB, an LCID that is the same as the target SLRB cannot be used for other SLRBs belonging to the sidelink formed by the first terminal and the second terminal and having the same source ID and the same target ID as the target SLRB.

When the logical channel ID included in the SLRB configuration information of other SLRBs other than the target SLRB corresponding to the assistance information and belonging to the sidelink formed by the first terminal and the second terminal is the same as the logical channel ID included in the SLRB configuration information of the target SLRB, updating the logical channel IDs of the other SLRBs to be different from the logical channel ID included in the SLRB configuration information of the target SLRB.

Here, that is to say, when the first network device has performed SLRB configuration on other SLRBs other than the target SLRB corresponding to the assistance information and belonging to the sidelink formed by the first terminal and the second terminal, and the logical channel ID included in the configured SLRB configuration information is the same as the logical channel ID included in the SLRB configuration information of the target SLRB, then changing the logic channel IDs of the other SLRBs to be different from the logical channel ID included in the SLRB configuration information of the target SLRB. In this way, configuration conflicts among different SLRBs of the same terminal can be avoided.

When the logical channel ID included in the SLRB configuration information of other SLRBs other than the target SLRB corresponding to the assistance information and belonging to the sidelink formed by the first terminal and the second terminal and having the same source ID and the same target ID as the target SLRB is the same as the logical channel ID included in the SLRB configuration information of the target SLRB, updating the logical channel IDs of the other SLRBs to be different from the logical channel ID included in the SLRB configuration information of the target SLRB.

Figure 4:
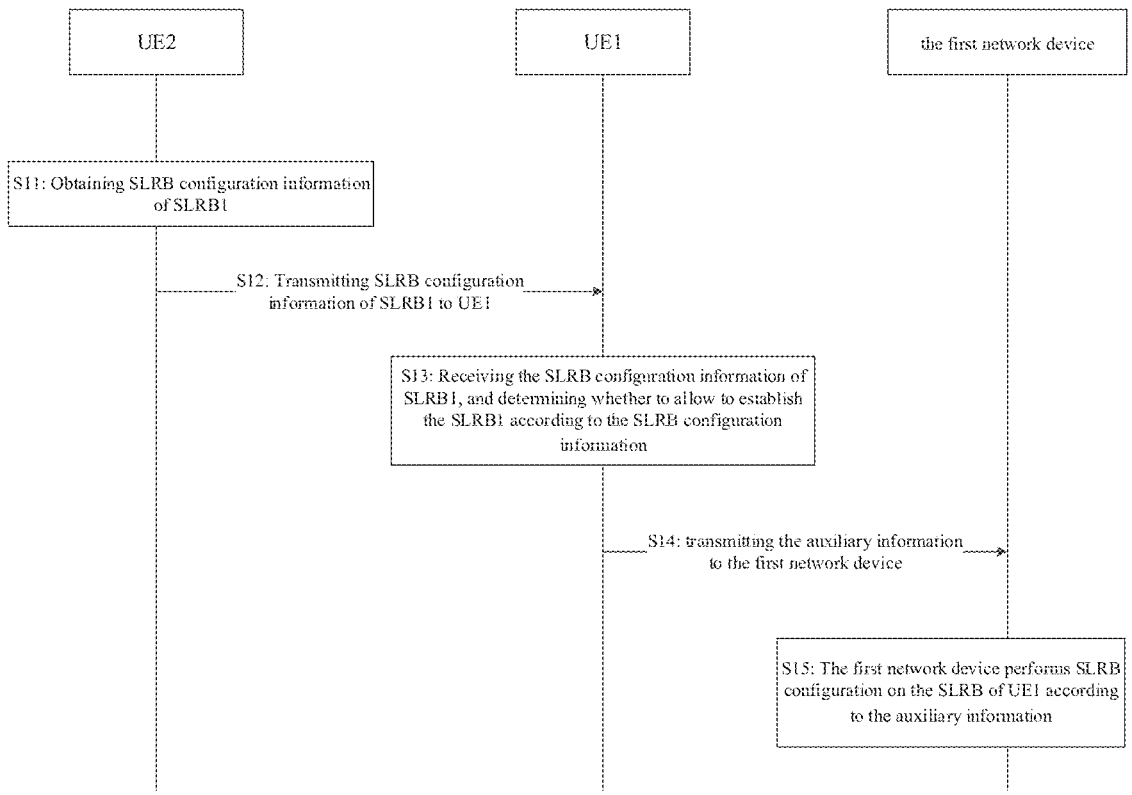
FIG. 4 is a specific flowchart of an application of the sidelink interface radio bearer configuration method among the first terminal, the second terminal and a first network device according to an embodiment of the present disclosure.

In the following, as shown in FIG. 4, the specific implementation process of the sidelink interface radio bearer configuration method of the present disclosure will be described in detail with reference to Example 2.

In this example, UE1 and UE2 are two terminals that communicate through a sidelink interface. UE1 is on the network and in the RRC connected state. The first network device, that is, the SLRB configuration information management node of the UE1 may include, but is not limited to: a serving base station, a Distributed Unit (DU), or a Central Unit (CU). The specific steps are described as follows:

S11: Obtaining SLRB configuration information of SLRB1;

Here, UE2 obtains the configuration information of SLRB1. The SLRB1 (that is, the target SLRB described in the foregoing embodiment) is any bearer used between UE1 and UE2. For example, the SLRB1 may be one of the following SLRBs:

Bi-directional SLRB of RLC AM;
Bi-directional SLRB of RLC UM;
SLRB of unidirectional RLC UM;
SLRB of unidirectional RLC TM.

Specifically, the SLRB configuration information corresponding to SLRB 1 is obtained according to the current RRC state. Among them, the specific obtaining method is as follows:

S12: Transmitting SLRB configuration information of SLRB1 to UE1;

In this step, UE2 transmits SLRB configuration information of SLRB1 to UE1.

Optionally, UE2 transmits the SLRB configuration information of SLRB1 to UE1 through the sidelink interface signaling bearer.

S13: Receiving the SLRB configuration information of SLRB1, and determining whether to allow to establish the SLRB1 according to the SLRB configuration information;

The subject of execution in this step is UE1, and UE1 determining whether to allow to establish the SLRB1 according to the SLRB configuration information is described in the foregoing Example 1, which will not be repeated here.

When it is determined in step S13 that the SLRB1 is allowed to be established, then continue to perform step S14.

S14: transmitting the assistance information to the first network device;

The subject of execution in this step is UE1.

Here, the assistance information includes at least one of the following:

The radio bearer identification (ID) of the SLRB1;
The logical channel ID of the SLRB1;
The first terminal uses part or all of the SLRB configuration information used when the first terminal uses the SLRB1 to transmit data.

Wherein, the SLRB configuration information of SLRB1 includes at least one of the following:

Source L2 ID;
Destination L2 ID;
Transmission type ID;
SLRB ID;
SDAP layer configuration information;
PDCP layer configuration information;
RLC layer configuration information;
MAC layer configuration information;
PHY layer configuration information.

It should be noted that, before transmitting the assistance information to the first network device, the assistance information needs to be determined. The specific determination step may refer to the above Example 1, which will not be repeated here.

Here, the UE1 transmits the determined assistance information to the first network device, that is, the SLRB configuration information management node, and the specifically used signaling may be RRC signaling, MAC signaling, or physical layer signaling.

S15: The first network device performs SLRB configuration on the SLRB of UE1 according to the assistance information;

The first network device performing SLRB configuration on the SLRB of UE1 according to the assistance information specifically includes:

When the first network device performs the SLRB configuration on the SLRB1 corresponding to the assistance information, the SLRB configuration is completely the same as the SLRB configuration information of the SLRB1 provided in the assistance information.

For example, when the first network device decides to map a QoS flow to SLRB 1, then the SLRB configuration should be completely the same as the SLRB configuration of SLRB1 received by UE1 from UE2.

When the first network device performs SLRB configuration on other SLRBs other than the SLRB1 corresponding to the assistance information and belonging to the sidelink formed by UE1 and UE2, then the LCID of the other SLRBs is different from the LCID in the SLRB configuration information of SLRB1 provided in the assistance information.

For example, when the first network device decides to map a QoS flow to other SLRBs other than SLRB 1, then the SLRB that belongs to the same Source L2 ID and Destination L2 ID as SLRB 1 cannot use the same LCID as the SLRB1.

When the first network device perform configuration on other SLRBs other than the SLRB1 corresponding to the assistance information and belonging to the sidelink formed by UE1 and UE2, and having the same source ID and the same target ID as the target SLRB, the configured LCID of other SLRBs is different from the LCID in the SLRB configuration information of SLRB1 provided by the assistance information.

For example, when the first network device decides to map a QoS flow to other SLRBs other than the target SLRB, then the other SLRB that belongs to the sidelink formed by UE1 and UE2 and having the same source ID and the same target ID as the SLRB1 cannot use the same LCID as SLRB 1.

When there is a conflict between the LCID in the SLRB1 configuration information and the LCID allocated by the first network device for other SLRBs between UE1 and UE2, or when there is a conflict between the LCID in the SLRB1 configuration information and the LCID allocated by the first network device for other SLRBs between UE1 and UE2 and having the same source ID and the same target ID as the SLRB1, so the protocol layer responsible for SLRB configuration information management needs to update the LCIDs allocated by other SLRBs.

In the sidelink interface radio bearer configuration method of an embodiment of the present disclosure, the assistance information transmitted by a first terminal is received; the SLRB configuration is performed on the SLRB of the first terminal according to the assistance information; and/or, according to the assistance information, it is determined whether to allow to establish the target SLRB, it can avoid the SLRB configuration conflicts for the same SLRB between the transmitting terminal and receiving terminal in the sidelink communication, and at the same time the SLRB configuration conflicts among different SLRBs of the same terminal is avoided.

As shown in FIG. 5, a schematic flowchart of a sidelink interface radio bearer configuration method provided by an embodiment of the present disclosure, which is applied to a second terminal, includes:

Step 501: Transmitting SLRB configuration information of a target radio bearer SLRB of a sidelink interface to a first terminal.

In this step, optionally, the SLRB configuration information includes at least one of the following:

Source ID;
Target ID;
Transmission type ID;
SLRB ID;
Service data adaptation protocol layer configuration information;
Packet data convergence protocol layer configuration information;
Radio link control layer configuration information;
Media access control layer configuration information;
Physical layer configuration information.

In the sidelink interface radio bearer configuration method of the embodiment of the present disclosure, the SLRB configuration information of the target radio bearer SLRB of the sidelink interface is transmitted to the first terminal to provide a basis for the first terminal to determine whether to allow the establishment of the target SLRB, thereby avoiding the SLRB configuration conflicts of the transmitting terminal and the receiving terminal of the sidelink communication on the same SLRB, and avoiding the SLRB configuration conflicts among different SLRBs of the same terminal.

Based on the embodiment shown in FIG. 5, as an optional implementation, the method may further include:

Receiving a first response message transmitted by the first terminal, wherein the first response message is used to indicate that the target SLRB is successfully configured; or, Receiving a second response message transmitted by the first terminal, wherein the second response message is used to indicate that the target SLRB is not successfully configured.

In this step, the second terminal receives the second response message transmitted by the first terminal, it indicates that the first terminal refuses to establish the target SLRB according to the SLRB configuration information of the target SLRB, that is, the target SLRB is not successfully configured.

Optionally, the second response message carries at least one of the following information:

Being empty;
A reason that the target SLRB is not successfully configured;
First indication information of part or all of logical channel IDs currently occupied by the first terminal on the sidelink formed by the first terminal and the second terminal;
Second indication information of part or all of the logical channel IDs currently occupied by the first terminal in the logical channel ID set corresponding to combination of the source ID and the target ID corresponding to the target SLRB on the sidelink formed by the first terminal and the second terminal;
Third indication information of all or part of the logical channel IDs currently available by the first terminal on the sidelink formed by the first terminal and the second terminal;
Fourth indication information of part or all of the logical channel IDs currently available by the first terminal in the logical channel ID set corresponding to the combination of the source ID and the target ID corresponding to the target SLRB on the sidelink formed by the first terminal and the second terminal.

Here, the reason why the first terminal refuses to establish the target SLRB may be, but is not limited to, a SLRB configuration conflict.

Based on this, as an optional implementation, after receiving the second response message transmitted by the first terminal, the method further includes:

Transmitting, to a second network device or a protocol layer of the second terminal responsible for SLRB configuration information management, request information for requesting to change the SLRB configuration information of the target SLRB.

Here, it should be noted that, when the second terminal is on the network and in the RRC connected state, the request information for requesting to change the SLRB configuration information of the target SLRB is transmitted to the second network device.

When the second terminal is on the network and in the RRC idle state or the RRC inactive state, or when the second terminal is off the network; the request information for requesting to change the SLRB configuration information of the target SLRB is transmitted to the protocol layer of the second terminal responsible for the management of the SLRB configuration information.

Optionally, the second network device is a serving base station, a serving distributed unit DU, or a serving centralized unit CU of the second terminal.

Optionally, the protocol layer responsible for SLRB configuration information management is a radio resource control RRC protocol layer. That is, in this embodiment, the protocol layer of the second terminal responsible for SLRB configuration information management is the RRC layer of the second terminal.

Here, the RRC layer of the second terminal receives the SLRB configuration corresponding to different QoS parameters/different transmission modes configured by the network through the SIB.

Optionally, the request information carries at least one of the following information:

First indication information of part or all of logical channel IDs currently occupied by the first terminal on the sidelink formed by the first terminal and the second terminal;
Second indication information of part or all of the logical channel IDs currently occupied by the first terminal in the logical channel ID set corresponding to combination of the source ID and the target ID corresponding to the target SLRB on the sidelink formed by the first terminal and the second terminal;
Third indication information of all or part of the logical channel IDs currently available by the first terminal on the sidelink formed by the first terminal and the second terminal;
Fourth indication information of part or all of the logical channel IDs currently available by the first terminal in the logical channel ID set corresponding to the combination of the source ID and the target ID corresponding to the target SLRB on the sidelink formed by the first terminal and the second terminal.

As an optional implementation, the second terminal is on the network and in the RRC idle state or inactive state, or the second terminal is off the network; after transmitting the request information for changing the SLRB configuration information of the target SLRB to the protocol layer of the second terminal for responsible for SLRB configuration information management, the method further includes:

According to the request information, updating a logical channel ID included in the SLRB configuration information of the target SLRB to make it different from a logical channel ID included in the SLRB configuration information of another SLRB currently being established or having been established between the first terminal and the second terminal; or, According to the request information, updating the logical channel ID included in the SLRB configuration information of the target SLRB to make it different from a logical channel ID included in the SLRB configuration information of another SLRB currently being established or having been established between the first terminal and the second terminal and using the same source ID and the same target ID as the target SLRB.

Here, because the first terminal refuses to establish the target SLRB, it means that there is a SLRB configuration conflict between the SLRB configuration information of the target SLRB transmitted by the second terminal and other SLRBs being established or already established between the first terminal and the second terminal, or it means that there is a SLRB configuration conflict between the SLRB configuration information of the target SLRB transmitted by the second terminal and other SLRBs being established or having been established between the first terminal and the second terminal and using the same source ID and the same target ID as the target SLRB. By updating the logical channel ID included in the SLRB configuration information of the target SLRB, the logical channel ID is made different from a logical channel ID included in the SLRB configuration information of another SLRB currently being established or having been established between the first terminal and the second terminal, or a logical channel ID included in the SLRB configuration information of another SLRB currently being established or having been established between the first terminal and the second terminal and using the same source ID and the same target ID as the target SLRB, which can avoid the SLRB configuration conflicts on the same SLRB between the transmitting terminal and the receiving terminal of the sidelink communication, and at the same time avoiding the SLRB configuration conflicts among different SLRBs of the same terminal.

In the following, as shown in FIG. 6, the specific implementation process of the sidelink interface radio bearer configuration method of the present disclosure is described in detail with reference to Example 3.

In this example, UE1 and UE2 are two terminals that communicate through a sidelink interface. UE2 is on the network and in the RRC idle state or RRC inactive state, or UE2 is off the network. The specific steps are described as follows:

S111: Obtaining SLRB configuration information of SLRB1;

Here, UE2 obtains the configuration information of SLRB1. The SLRB1 (that is, the target SLRB described in the foregoing embodiment) is any bearer used between UE1 and UE2. For example, the SLRB1 may be one of the following SLRBs:

Bi-directional SLRB of RLC AM;
Bi-directional SLRB of RLC UM;
SLRB of unidirectional RLC UM;
SLRB of unidirectional RLC TM.

Specifically, the SLRB configuration information corresponding to SLRB 1 is obtained according to the current RRC state. Among them, the specific obtaining method is as follows:

S112: Transmitting SLRB configuration information of SLRB1 to UE1;

In this step, UE2 transmits SLRB configuration information of SLRB1 to UE 1.

Optionally, UE2 transmits the SLRB configuration information of SLRB1 to UE1 through the sidelink interface signaling bearer.

S113: Receiving the SLRB configuration information of SLRB1, and determining whether to allow to establish the SLRB1 according to the SLRB configuration information;

The subject of execution in this step is UE1, and UE1 determining whether to allow to establish the SLRB1 according to the SLRB configuration information is described in the foregoing Example 1, which will not be repeated here.

When it is determined in step S113 that the SLRB1 is allowed to be established, then continue to perform step S114.

S114: Transmitting a response message to UE2, indicating that the SLRB1 is not successfully configured;

Here, when the UE1 determines that the SLRB1 is not allowed to be established, the UE1 transmits a response message to the UE2 for indicating that the SLRB1 is not successfully configured and carrying the reason for the configuration failure. The reason for the configuration failure may be, but not limited to, the SLRB configuration conflict.

Optionally, the response message may further carry first indication information of part or all of logical channel IDs currently occupied by UE1 on the sidelink formed by UE1 and UE2; or second indication information of part or all of the logical channel IDs currently occupied by UE1 in the logical channel ID set corresponding to combination of the source ID and the target ID corresponding to the target SLRB on the sidelink formed by UE1 and UE2; or third indication information of all or part of the logical channel IDs currently available by UE1 on the sidelink formed by UE1 and UE2; or fourth indication information of part or all of the logical channel IDs currently available by UE1 in the logical channel ID set corresponding to the combination of the source ID and the target ID corresponding to the target SLRB on the sidelink formed by UE1 and UE2.

S115: Transmitting a request message to the protocol layer of UE2 responsible for SLRB configuration information management, requesting to change the SLRB configuration of SLRB1;

Here, after UE2 receives a response message for indicating refusing to establish the SLRB1, UE2 transmits the request message to the protocol layer responsible for SLRB configuration information management, that is, the RRC layer of UE2, requests to change the SLRB configuration of SLRB1.

Optionally, the request message may carry first indication information of part or all of logical channel IDs currently occupied by UE1 on the sidelink formed by UE1 and UE2; or second indication information of part or all of the logical channel IDs currently occupied by UE1 in the logical channel ID set corresponding to combination of the source ID and the target ID corresponding to the target SLRB on the sidelink formed by UE1 and UE2; or third indication information of all or part of the logical channel IDs currently available by UE1 on the sidelink formed by UE1 and UE2; or fourth indication information of part or all of the logical channel IDs currently available by UE1 in the logical channel ID set corresponding to the combination of the source ID and the target ID corresponding to the target SLRB on the sidelink formed by UE1 and UE2.

S116: The protocol layer of UE2 responsible for SLRB configuration information management determines the new SLRB configuration of SLRB1;

Here, the protocol layer of UE2 responsible for the SLRB configuration information management changes the logical channel ID included in the SLRB configuration information of SLRB1 according to the request message in step S115, so that the logical channel ID is different from a logical channel ID included in the SLRB configuration information of another SLRB currently being established or having been established between UE1 and UE2, or a logical channel ID included in the SLRB configuration information of another SLRB currently being established or having been established between the first terminal and the second terminal and using the same source ID and the same target ID as the target SLRB, which can avoid the SLRB configuration conflicts on the same SLRB between the transmitting terminal and the receiving terminal of the sidelink communication, so as to avoid conflicts between the LCID configured for the SLRB1 and the LCID configured for other SLRBs that are currently established or have been established between UE1/UE2.

In the sidelink interface radio bearer configuration method of the embodiment of the present disclosure, the SLRB configuration information of the target radio bearer SLRB of the sidelink interface is transmitted to the first terminal to provide a basis for the first terminal to determine whether to allow the establishment of the target SLRB, thereby avoiding the SLRB configuration conflicts for the same SLRB between the transmitting terminal and the receiving terminal of the sidelink communication, while avoiding the SLRB configuration conflicts among different SLRBs of the same terminal.

Figure 7:
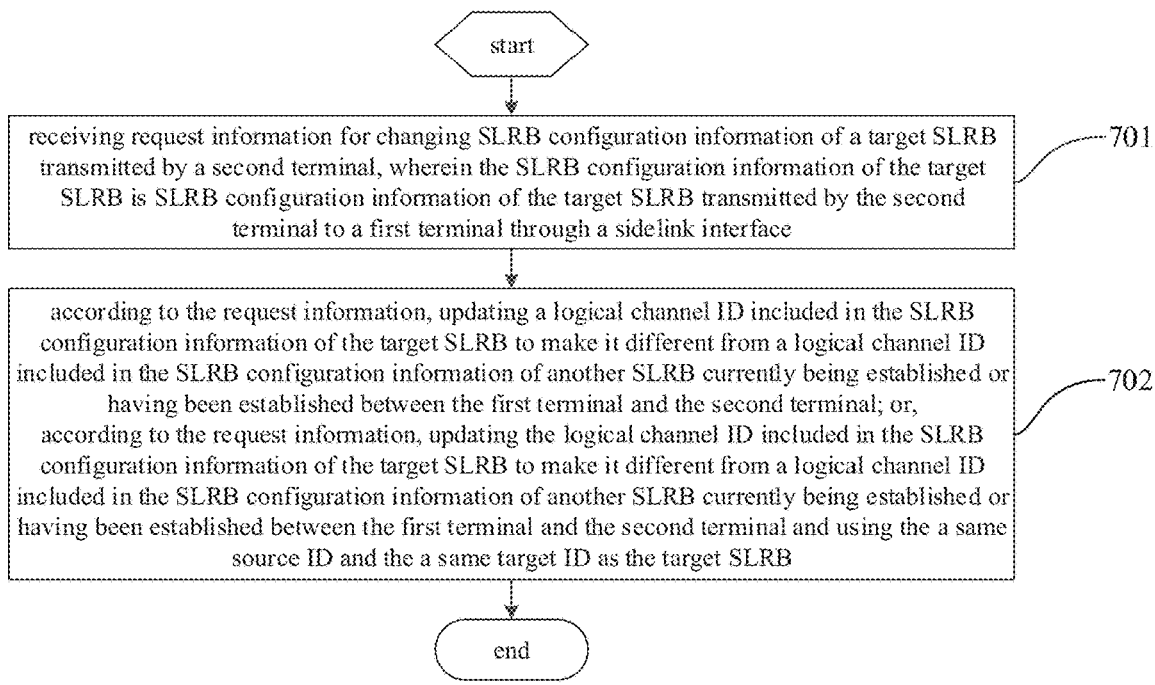
FIG. 7 is still yet another schematic flowchart of the sidelink interface radio bearer configuration method according to an embodiment of the present disclosure.

As shown in FIG. 7, a schematic flow chart of the sidelink interface radio bearer configuration method provided by an embodiment of the present disclosure, which is applied to a second network device, includes:

Step 701: Receiving request information for changing SLRB configuration information of a target SLRB transmitted by a second terminal, wherein the SLRB configuration information of the target SLRB is SLRB configuration information of the target SLRB transmitted by the second terminal to a first terminal through a sidelink interface;

In this step, optionally, the second network device is a serving base station, a serving distributed unit DU or a serving centralized unit CU of the second terminal.

Here, optionally, the SLRB configuration information includes at least one of the following:
Source ID;
Target ID;
Transmission type ID;
SLRB ID;
Service data adaptation protocol layer configuration information;
Packet data convergence protocol layer configuration information;
Radio link control layer configuration information;
Media access control layer configuration information;
Physical layer configuration information.

Optionally, the request information carries at least one of the following information:
First indication information of part or all of logical channel IDs currently occupied by the first terminal on the sidelink formed by the first terminal and the second terminal;
Second indication information of part or all of the logical channel IDs currently occupied by the first terminal in the logical channel ID set corresponding to combination of the source ID and the target ID corresponding to the target SLRB on the sidelink formed by the first terminal and the second terminal;
Third indication information of all or part of the logical channel IDs currently available by the first terminal on the sidelink formed by the first terminal and the second terminal;
Fourth indication information of part or all of the logical channel IDs currently available by the first terminal in the logical channel ID set corresponding to the combination of the source ID and the target ID corresponding to the target SLRB on the sidelink formed by the first terminal and the second terminal.

Step 702: According to the request information, updating a logical channel ID included in the SLRB configuration information of the target SLRB to make it different from a logical channel ID included in the SLRB configuration information of another SLRB currently being established or having been established between the first terminal and the second terminal; or, According to the request information, updating the logical channel ID included in the SLRB configuration information of the target SLRB to make it different from a logical channel ID included in the SLRB configuration information of another SLRB currently being established or having been established between the first terminal and the second terminal and using the same source ID and the same target ID as the target SLRB.

Here, because the target SLRB is not successfully configured, it means that there is a SLRB configuration conflict between the SLRB configuration information of the target SLRB transmitted by the second terminal and other SLRBs being established or already established between the first terminal and the second terminal, or it means that there is a SLRB configuration conflict between the SLRB configuration information of the target SLRB transmitted by the second terminal and other SLRBs being established or having been established between the first terminal and the second terminal and using the same source ID and the same target ID as the target SLRB. By sending the request information for updating a logical channel ID included in the SLRB configuration information of the target SLRB to the second network device, the logical channel ID is made different from a logical channel ID included in the SLRB configuration information of another SLRB currently being established or having been established between the first terminal and the second terminal, or a logical channel ID included in the SLRB configuration information of another SLRB currently being established or having been established between the first terminal and the second terminal and using the same source ID and the same target ID as the target SLRB, which can avoid the SLRB configuration conflicts on the same SLRB between the transmitting terminal and the receiving terminal of the sidelink communication, and at the same time avoiding the SLRB configuration conflicts among different SLRBs of the same terminal.

Figure 8:
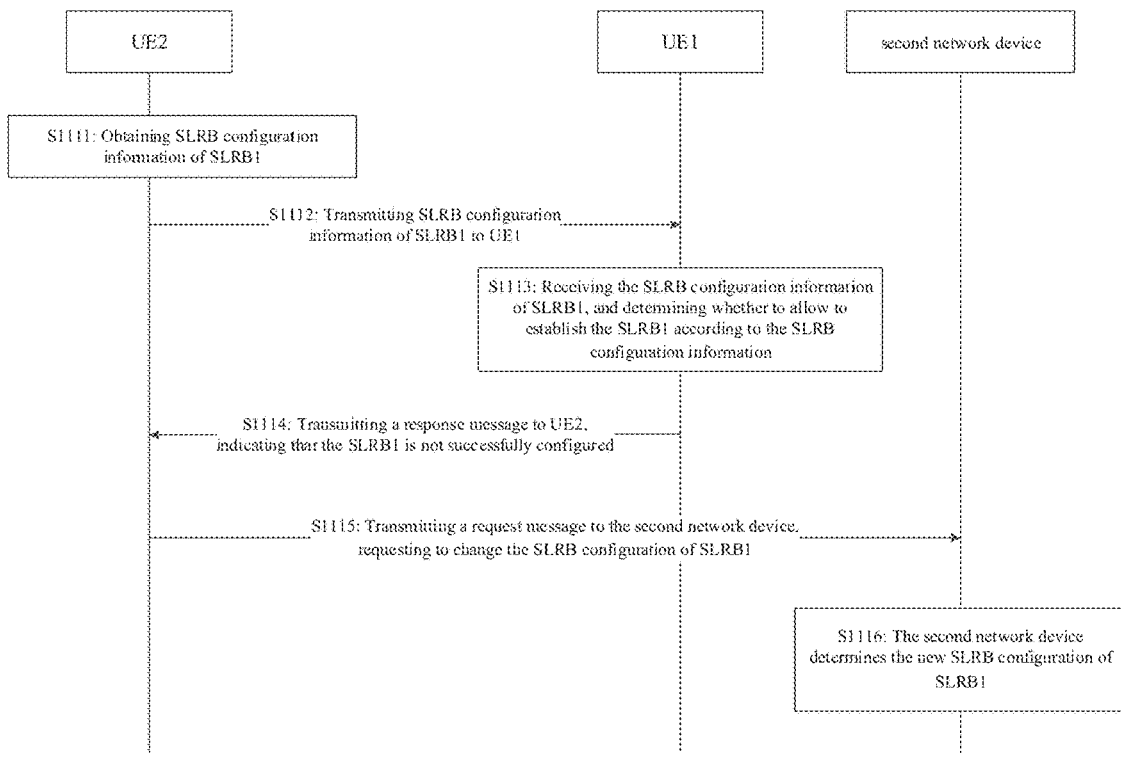
FIG. 8 is a specific flowchart of an application of the sidelink interface radio bearer configuration method among the first terminal, the second terminal and a second network device according to an embodiment of the present disclosure.

In the following, as shown in FIG. 8, the specific implementation process of the sidelink interface radio bearer configuration method of the present disclosure is described in detail with reference to Example 4.

In this example, UE1 and UE2 are two terminals that communicate through a sidelink interface. UE2 is on the network and in the RRC connected state. The second network device, namely the SLRB configuration information management node of UE2, may include but is not limited to: a serving base station, a DU or a CU. The specific steps are described as follows:

S1111: Obtaining SLRB configuration information of SLRB1;

Here, UE2 obtains the configuration information of SLRB1. The SLRB1 (that is, the target SLRB described in the foregoing embodiment) is any bearer used between UE1 and UE2. For example, the SLRB1 may be one of the following SLRBs:

Bi-directional SLRB of RLC AM;
Bi-directional SLRB of RLC UM;
SLRB of unidirectional RLC UM;
SLRB of unidirectional RLC TM.

Specifically, the SLRB configuration information corresponding to SLRB 1 is obtained according to the current RRC state. Among them, the specific obtaining method is as follows:

S1112: Transmitting SLRB configuration information of SLRB1 to UE1;

In this step, UE2 transmits SLRB configuration information of SLRB1 to UE1.

Optionally, UE2 transmits the SLRB configuration information of SLRB1 to UE1 through the sidelink interface signaling bearer.

S1113: Receiving the SLRB configuration information of SLRB1, and determining whether to allow to establish the SLRB1 according to the SLRB configuration information;

The subject of execution in this step is UE1, and UE1 determining whether to allow to establish the SLRB1 according to the SLRB configuration information is described in the foregoing Example 1, which will not be repeated here.

When it is determined in step S1113 that the SLRB1 is allowed to be established, then continue to perform step S1114.

S1114: Transmitting a response message to UE2, indicating that the SLRB1 is not successfully configured;

Here, when the UE1 determines that the SLRB1 is not allowed to be established, the UE1 transmits a response message to the UE2 for indicating that the SLRB1 is not successfully configured and carrying the reason for the configuration failure. The reason for the configuration failure may be, but not limited to, the SLRB configuration conflict.

Optionally, the response message may further carry first indication information of part or all of logical channel IDs currently occupied by UE1 on the sidelink formed by UE1 and UE2; or second indication information of part or all of the logical channel IDs currently occupied by UE1 in the logical channel ID set corresponding to combination of the source ID and the target ID corresponding to the target SLRB on the sidelink formed by UE1 and UE2; or third indication information of all or part of the logical channel IDs currently available by UE1 on the sidelink formed by UE1 and UE2; or fourth indication information of part or all of the logical channel IDs currently available by UE1 in the logical channel ID set corresponding to the combination of the source ID and the target ID corresponding to the target SLRB on the sidelink formed by UE1 and UE2.

S1115: Transmitting a request message to the second network device, requesting to change the SLRB configuration of SLRB1;

Here, after the UE2 receives the response message indicating that the SLRB1 is refused to be established, UE2 transmits the request message to the second network device to request to change the SLRB configuration of the SLRB1.

Optionally, the request message may carry first indication information of part or all of logical channel IDs currently occupied by UE1 on the sidelink formed by UE1 and UE2; or second indication information of part or all of the logical channel IDs currently occupied by UE1 in the logical channel ID set corresponding to combination of the source ID and the target ID corresponding to the target SLRB on the sidelink formed by UE1 and UE2; or third indication information of all or part of the logical channel IDs currently available by UE1 on the sidelink formed by UE1 and UE2; or fourth indication information of part or all of the logical channel IDs currently available by UE1 in the logical channel ID set corresponding to the combination of the source ID and the target ID corresponding to the target SLRB on the sidelink formed by UE1 and UE2.

S1116: The second network device determines the new SLRB configuration of SLRB1;

Here, the second network device changes the logical channel ID included in the SLRB configuration information of SLRB1 according to the request message in step S1115, so that the logical channel ID is different from a logical channel ID included in the SLRB configuration information of another SLRB currently being established or having been established between UE1 and UE2, or a logical channel ID included in the SLRB configuration information of another SLRB currently being established or having been established between UE1 and UE2 and using the same source ID and the same target ID as the target SLRB, which can avoid the SLRB configuration conflicts on the same SLRB between the transmitting terminal and the receiving terminal of the sidelink communication, so as to avoid conflicts between the LCID configured for the SLRB1 and the LCID configured for other SLRBs that are currently established or have been established between UE1/UE2.

In the sidelink interface radio bearer configuration method of the embodiment of the present disclosure, by receiving the request information transmitted by the second terminal for requesting to change the SLRB configuration information of the target SLRB, the SLRB configuration information of the target SLRB is the SLRB configuration information of the target SLRB transmitted by the second terminal to the first terminal through the sidelink interface; according to the request information, updating a logic channel ID included in the SLRB configuration information of the target SLRB, so that the logical channel ID is different from a logical channel ID included in the SLRB configuration information of another SLRB currently being established or having been established between the first terminal and the second terminal, or a logical channel ID included in the SLRB configuration information of another SLRB currently being established or having been established between the first terminal and the second terminal and using the same source ID and the same target ID as the target SLRB, which can avoid the SLRB configuration conflicts on the same SLRB between the transmitting terminal and the receiving terminal of the sidelink communication, so as to avoid SLRB configuration conflict among different SLRBs of the same terminal.

Figure 9:
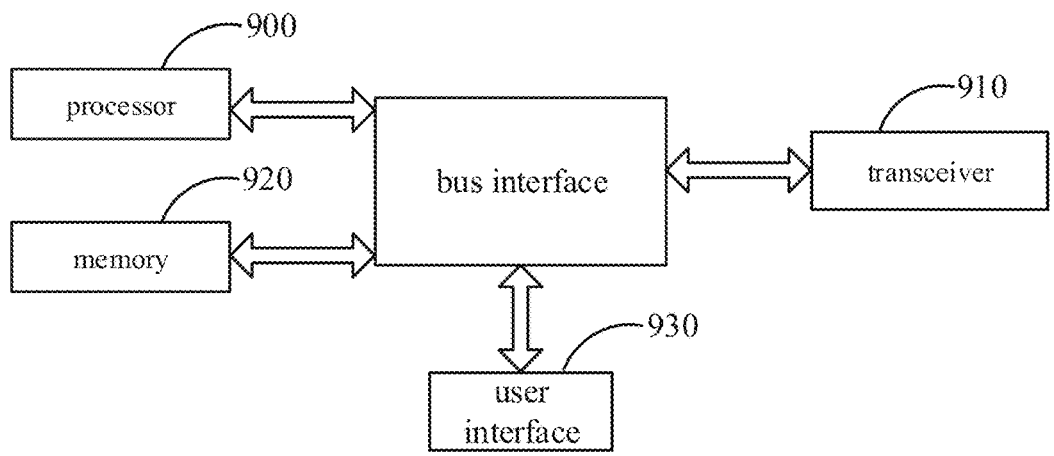
FIG. 9 is a structural block diagram of a terminal according to an embodiment of the disclosure.

As shown in FIG. 9, an embodiment of the present disclosure also provides a terminal. The terminal is a first terminal and includes: a memory 920, a processor 900, a transceiver 910, a bus interface, and a program stored on the memory 920 and executed by the processor 900, the transceiver 910 is configured to receive SLRB configuration information of a target radio bearer SLRB of a sidelink interface transmitted by a second terminal; the processor 500 is configured to read the program in the memory 520, and execute the following process:

According to the SLRB configuration information, transmitting assistance information to the first network device serving the first terminal and/or determining whether to allow to establish the target SLRB.

Among them, in FIG. 9, the bus architecture may include any number of interconnected buses and bridges. Specifically, various circuits of one or more processors represented by the processor 900 and the memory represented by the memory 920 are linked together. The bus architecture can also link various other circuits such as peripherals, voltage regulators, power management circuits, etc., which are all known in the art, and therefore, will not be further described herein. The bus interface provides the interface. The transceiver 910 may be a plurality of elements, including a transmitter and a receiver, and provide a unit for communicating with various other devices on the transmission medium. For different user equipment, the user interface 930 may also be an interface capable of connecting externally and internally with the required device. The connected device includes but not limited to a keypad, a display, a speaker, a microphone, a joystick, and the like.

The processor 900 is responsible for managing the bus architecture and general processing, and the memory 920 can store data used by the processor 900 when performing operations.

Optionally, the processor 900 is further configured to:
When the determination result is that the target SLRB is allowed to be established, transmit assistance information to the first network device or the protocol layer of the first terminal responsible for SLRB configuration information management; or,
When the determination result is that the target SLRB is allowed to be established, transmit a first response message to the second terminal, wherein the first response message is used to indicate that the target SLRB is successfully configured; or,
When the determination result is that the target SLRB is refused to be established, transmit a second response message to the second terminal, wherein the second response message is used to indicate that the target SLRB is not successfully configured.

Optionally, the assistance information includes at least one of the following:
Radio bearer identification (ID) of the target SLRB;
Logical channel ID of the target SLRB;
Part or all of the SLRB configurations transmitted by the first terminal.

Optionally, the first terminal is on the network and in a RRC idle or inactive state, or the first terminal is off the network; the processor 900 is further configured to:
The protocol layer of the first terminal responsible for the SLRB configuration information management performs SLRB configuration on the SLRB of the first terminal according to the assistance information.

Optionally, the processor 900 is further configured to:
When performing SLRB configuration on the target SLRB corresponding to the assistance information, configure the SLRB configuration information of the SLRB of the first terminal to be the same as the SLRB configuration information of the target SLRB;

When performing configuration on other SLRBs other than the target SLRB corresponding to the assistance information and belonging to the sidelink formed by the first terminal and the second terminal, configure a logical channel ID included in the SLRB configuration information of the other SLRBs to be different from the logical channel ID included in the SLRB configuration information of the target SLRB;

When performing configuration on other SLRBs other than the target SLRB corresponding to the assistance information and belonging to the sidelink formed by the first terminal and the second terminal and having the same source ID and the same target ID as the target SLRB, configure a logical channel ID included in the SLRB configuration information of the other SLRBs to be different from the logical channel ID included in the SLRB configuration information of the target SLRB;

When the logical channel ID included in the SLRB configuration information of other SLRBs other than the target SLRB corresponding to the assistance information and belonging to the sidelink formed by the first terminal and the second terminal is the same as the logical channel ID included in the SLRB configuration information of the target SLRB, update the logical channel IDs of the other SLRBs to be different from the logical channel ID included in the SLRB configuration information of the target SLRB;

When the logical channel ID included in the SLRB configuration information of other SLRBs other than the target SLRB corresponding to the assistance information and belonging to the sidelink formed by the first terminal and the second terminal and having the same source ID and the same target ID as the target SLRB is the same as the logical channel ID included in the SLRB configuration information of the target SLRB, update the logical channel IDs of the other SLRBs to be different from the logical channel ID included in the SLRB configuration information of the target SLRB.

Optionally, the second response message carries at least one of the following information:
Being empty;
A reason that the target SLRB is not successfully configured;
First indication information of part or all of logical channel IDs currently occupied by the first terminal on the sidelink formed by the first terminal and the second terminal;
Second indication information of part or all of the logical channel IDs currently occupied by the first terminal in the logical channel ID set corresponding to combination of the source ID and the target ID corresponding to the target SLRB on the sidelink formed by the first terminal and the second terminal;
Third indication information of all or part of the logical channel IDs currently available by the first terminal on the sidelink formed by the first terminal and the second terminal;
Fourth indication information of part or all of the logical channel IDs currently available by the first terminal in the logical channel ID set corresponding to the combination of the source ID and the target ID corresponding to the target SLRB on the sidelink formed by the first terminal and the second terminal.

Optionally, the processor 900 is further configured to:
Determine whether a logical channel ID included in SLRB configuration information corresponding to the target SLRB currently being established between the first terminal and the second terminal is the same as a logical channel ID included in SLRB configuration information corresponding to another SLRB that has been established or is being established between the first terminal and the second terminal; or, Determine whether the logical channel ID included in the SLRB configuration information corresponding to the target SLRB currently being established between the first terminal and the second terminal is the same as a logical channel ID included in SLRB configuration information corresponding to another SLRB that has been established or is being established between the first terminal and the second terminal and has the same source ID and destination ID as the target SLRB; or, Determine whether a radio bearer ID included in SLRB configuration information corresponding to the target SLRB currently being established between the first terminal and the second terminal is the same as a radio bearer ID included in SLRB configuration information corresponding to another SLRB that has been established or is being established between the first terminal and the second terminal; or, Determine whether the radio bearer ID included in the SLRB configuration information corresponding to the target SLRB currently being established between the first terminal and the second terminal is the same as a radio bearer ID included in SLRB configuration information corresponding to another SLRB that has been established or is being established between the first terminal and the second terminal and has the same source ID and destination ID as the target SLRB; or, When the determination result is not the same, allow to establish the target SLRB; or, When the determination result is the same and meet a target condition, allow to establish the target SLRB;

Otherwise, refuse to establish the target SLRB.

Optionally, the target condition includes at least one of the following:

A QoS parameter of the target SLRB being higher than a QoS parameter of another SLRB currently being established between the first terminal and the second terminal and using a same logic channel ID or a same radio bearer ID as the target SLRB;

The QoS parameter of the target SLRB being higher than a QoS parameter of another SLRB currently being established between the first terminal and the second terminal and using a same source ID, a same destination ID and a same logic channel ID or using a same source ID, a same destination ID and a same radio bearer ID as the target SLRB;

The QoS parameter of the target SLRB being higher than a QoS parameter of another SLRB currently having been established between the first terminal and the second terminal and using a same logic channel ID or a same radio bearer ID as the target SLRB;

The QoS parameter of the target SLRB being higher than a QoS parameter of another SLRB currently having been established between the first terminal and the second terminal and using a same source ID, a same destination ID and a same logic channel ID or using a same source ID, a same destination ID and a same radio bearer ID as the target SLRB;

A priority of the second terminal that initiates the establishment of the target SLRB being higher than a priority of a terminal that initiates the establishment of the other SLRB that uses the same logical channel ID or the same radio bearer ID as the target SLRB;

An initiation time of the target SLRB being earlier than an initiation time of the other SLRB that uses the same logical channel ID or the same radio bearer ID as the target SLRB.

Optionally, the SLRB configuration information includes at least one of the following:

Source ID;

Target ID;

Transmission type ID;

SLRB ID;

Service data adaptation protocol layer configuration information;

Packet data convergence protocol layer configuration information;

Radio link control layer configuration information;

Media access control layer configuration information;

Physical layer configuration information.

Optionally, the protocol layer responsible for SLRB configuration information management is a radio resource control RRC protocol layer.

Optionally, the first network device is a serving base station, a serving distributed unit DU, or a serving centralized unit CU of the first terminal.

The embodiment of the present disclosure also provides a terminal, which is the first terminal. Since the principle of the first terminal to solve the problem is similar to the sidelink interface radio bearer configuration method in the embodiment of the present disclosure, the implementation of the terminal can refer to the implementation of the method, which will not be repeated.

In the terminal of an embodiment of the present disclosure, the SLRB configuration information of the target radio bearer SLRB of the sidelink interface transmitted by the second terminal is received; according to the SLRB configuration information, assistance information is transmitted to the first network device serving the first terminal and/or it is determined whether the target SLRB is allowed to be established. In this way, the first network device or the first terminal itself determines the configuration conflict of the received SLRB configuration information transmitted by the second terminal through the sidelink interface, it can avoid the SLRB configuration conflicts for the same SLRB between the transmitting terminal and receiving terminal in the sidelink communication, and at the same time the SLRB configuration conflicts among different SLRBs of the same terminal is avoided.

It should be noted that the terminal provided in the embodiments of the present disclosure is the first terminal capable of executing the above-mentioned sidelink interface radio bearer configuration method, and all the above-mentioned embodiments corresponding to the sidelink interface radio bearer configuration method on the first terminal side are applicable to the terminal, and the same or similar beneficial effects may be achieved.

Figure 10:
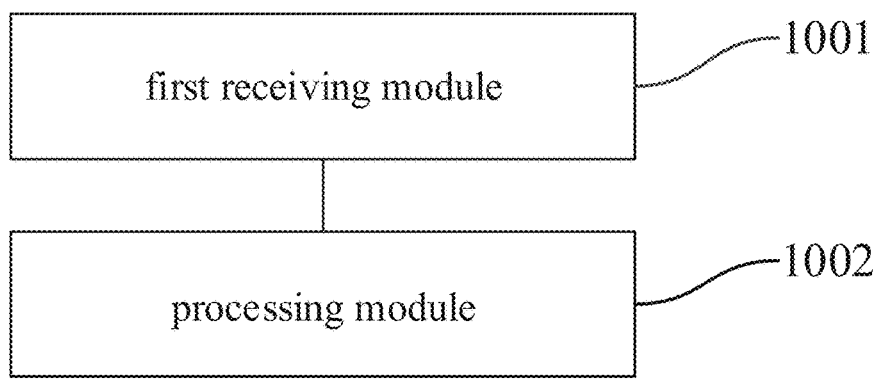
FIG. 10 is a schematic diagram of modules of a terminal according to an embodiment of the disclosure.

As shown in FIG. 10, an embodiment of the present disclosure also provides a terminal. The terminal is a first terminal and includes:

a first receiving module 1001, configured to receive SLRB configuration information of a target radio bearer SLRB of a sidelink interface transmitted by a second terminal;

a processing module 1002, configured to, according to the SLRB configuration information, transmit assistance information to the first network device serving the first terminal and/or determine whether to allow to establish the target SLRB.

The terminal of the embodiment of the present disclosure further includes:

a first transmitting module, configured to, when the determination result is that the target SLRB is allowed to be established, transmit assistance information to the first network device or the protocol layer of the first terminal responsible for SLRB configuration information management;

a second transmitting module, configured to, when the determination result is that the target SLRB is allowed to be established, transmit a first response message to the second terminal, wherein the first response message is used to indicate that the target SLRB is successfully configured; or when the determination result is that the target SLRB is refused to be established, transmit a second response message to the second terminal, wherein the second response message is used to indicate that the target SLRB is not successfully configured.

Optionally, the assistance information includes at least one of the following:

Radio bearer identification (ID) of the target SLRB;

Logical channel ID of the target SLRB;

Part or all of the SLRB configurations transmitted by the first terminal.

Optionally, the first terminal is on the network and in a radio resource control idle or inactive state, or the first terminal is off the network; correspondingly, the terminal in the embodiment of the present disclosure further includes:

a first configuration module, configured to, by the protocol layer of the first terminal responsible for the SLRB configuration information management, perform SLRB configuration on the SLRB of the first terminal according to the assistance information.

In the terminal of the embodiment of the present disclosure, the first configuration module includes:

a first configuration unit, configured to, when performing SLRB configuration on the target SLRB corresponding to the assistance information, configure the SLRB configuration information of the SLRB of the first terminal to be the same as the SLRB configuration information of the target SLRB;

a second configuration unit, configured to, when performing configuration on other SLRBs other than the target SLRB corresponding to the assistance information and belonging to the sidelink formed by the first terminal and the second terminal, configure a logical channel ID included in the SLRB configuration information of the other SLRBs to be different from the logical channel ID included in the SLRB configuration information of the target SLRB;

a third configuration unit, configured to, when performing configuration on other SLRBs other than the target SLRB corresponding to the assistance information and belonging to the sidelink formed by the first terminal and the second terminal and having the same source ID and the same target ID as the target SLRB, configure a logical channel ID included in the SLRB configuration information of the other SLRBs to be different from the logical channel ID included in the SLRB configuration information of the target SLRB;

a fourth configuration unit, configured to, when the logical channel ID included in the SLRB configuration information of other SLRBs other than the target SLRB corresponding to the assistance information and belonging to the sidelink formed by the first terminal and the second terminal is the same as the logical channel ID included in the SLRB configuration information of the target SLRB, update the logical channel IDs of the other SLRBs to be different from the logical channel ID included in the SLRB configuration information of the target SLRB;

a fifth configuration unit, configured to, when the logical channel ID included in the SLRB configuration information of other SLRBs other than the target SLRB corresponding to the assistance information and belonging to the sidelink formed by the first terminal and the second terminal and having the same source ID and the same target ID as the target SLRB is the same as the logical channel ID included in the SLRB configuration information of the target SLRB, update the logical channel IDs of the other SLRBs to be different from the logical channel ID included in the SLRB configuration information of the target SLRB.

Optionally, the second response message carries at least one of the following information:

Being empty;

A reason that the target SLRB is not successfully configured;

First indication information of part or all of logical channel IDs currently occupied by the first terminal on the sidelink formed by the first terminal and the second terminal;

Second indication information of part or all of the logical channel IDs currently occupied by the first terminal in the logical channel ID set corresponding to combination of the source ID and the target ID corresponding to the target SLRB on the sidelink formed by the first terminal and the second terminal;

Third indication information of all or part of the logical channel IDs currently available by the first terminal on the sidelink formed by the first terminal and the second terminal;

Fourth indication information of part or all of the logical channel IDs currently available by the first terminal in the logical channel ID set corresponding to the combination of the source ID and the target ID corresponding to the target SLRB on the sidelink formed by the first terminal and the second terminal.

In the terminal of the embodiment of the present disclosure, the processing module 1002 includes:

a first determining unit, configured to determine whether a logical channel ID included in SLRB configuration information corresponding to the target SLRB currently being established between the first terminal and the second terminal is the same as a logical channel ID included in SLRB configuration information corresponding to another SLRB that has been established or is being established between the first terminal and the second terminal; or, a second determining unit, configured to determine whether the logical channel ID included in the SLRB configuration information corresponding to the target SLRB currently being established between the first terminal and the second terminal is the same as a logical channel ID included in SLRB configuration information corresponding to another SLRB that has been established or is being established between the first terminal and the second terminal and has the same source ID and destination ID as the target SLRB; or, a third determining unit, configured to determine whether a radio bearer ID included in SLRB configuration information corresponding to the target SLRB currently being established between the first terminal and the second terminal is the same as a radio bearer ID included in SLRB configuration information corresponding to another SLRB that has been established or is being established between the first terminal and the second terminal; or, a fourth determining unit, configured to determine whether the radio bearer ID included in the SLRB configuration information corresponding to the target SLRB currently being established between the first terminal and the second terminal is the same as a radio bearer ID included in SLRB configuration information corresponding to another SLRB that has been established or is being established between the first terminal and the second terminal and has the same source ID and destination ID as the target SLRB;

a first processing unit, configured to allow to establish the target SLRB when the determination result is not the same;

a second processing unit, configured to allow to establish the target SLRB when the determination result is the same and meets a target condition; otherwise, refuse to establish the SLRB.

Optionally, the target condition includes at least one of the following:

A QoS parameter of the target SLRB being higher than a QoS parameter of another SLRB currently being established between the first terminal and the second terminal and using a same logic channel ID or a same radio bearer ID as the target SLRB;

The QoS parameter of the target SLRB being higher than a QoS parameter of another SLRB currently being established between the first terminal and the second terminal and using a same source ID, a same destination ID and a same logic channel ID or using a same source ID, a same destination ID and a same radio bearer ID as the target SLRB;

The QoS parameter of the target SLRB being higher than a QoS parameter of another SLRB currently having been established between the first terminal and the second terminal and using a same logic channel ID or a same radio bearer ID as the target SLRB;

The QoS parameter of the target SLRB being higher than a QoS parameter of another SLRB currently having been established between the first terminal and the second terminal and using a same source ID, a same destination ID and a same logic channel ID or using a same source ID, a same destination ID and a same radio bearer ID as the target SLRB;

A priority of the second terminal that initiates the establishment of the target SLRB being higher than a priority of a terminal that initiates the establishment of the other SLRB that uses the same logical channel ID or the same radio bearer ID as the target SLRB;

An initiation time of the target SLRB being earlier than an initiation time of the other SLRB that uses the same logical channel ID or the same radio bearer ID as the target SLRB.

Optionally, the SLRB configuration information includes at least one of the following:

Source ID;
Target ID;
Transmission type ID;
SLRB ID;
Service data adaptation protocol layer configuration information;
Packet data convergence protocol layer configuration information;
Radio link control layer configuration information;
Media access control layer configuration information;
Physical layer configuration information.

Optionally, the protocol layer responsible for SLRB configuration information management is a radio resource control RRC protocol layer.

Optionally, the first network device is a serving base station, a serving distributed unit DU, or a serving centralized unit CU of the first terminal.

The embodiment of the present disclosure also provides a terminal, which is the first terminal. Since the principle of the first terminal to solve the problem is similar to the sidelink interface radio bearer configuration method in the embodiment of the present disclosure, the implementation of the terminal can refer to the implementation of the method, which will not be repeated.

In the terminal of an embodiment of the present disclosure, the SLRB configuration information of the target radio bearer SLRB of the sidelink interface transmitted by the second terminal is received; according to the SLRB configuration information, assistance information is transmitted to the first network device serving the first terminal and/or it is determined whether the target SLRB is allowed to be established. In this way, the first network device or the first terminal itself determines the configuration conflict of the received SLRB configuration information transmitted by the second terminal through the sidelink interface, it can avoid the SLRB configuration conflicts for the same SLRB between the transmitting terminal and receiving terminal in the sidelink communication, and at the same time the SLRB configuration conflicts among different SLRBs of the same terminal is avoided.

It should be noted that the terminal provided in the embodiments of the present disclosure is the first terminal capable of executing the above-mentioned sidelink interface radio bearer configuration method, and all the above-mentioned embodiments corresponding to the sidelink interface radio bearer configuration method on the first terminal side are applicable to the terminal, and the same or similar beneficial effects may be achieved.

In some embodiments of the present disclosure, a computer-readable storage medium is also provided, on which a computer program is stored, and when the program is executed by a processor, the following steps are implemented:

Receiving SLRB configuration information of a target radio bearer SLRB of a sidelink interface transmitted by a second terminal;

According to the SLRB configuration information, transmitting assistance information to the first network device serving the first terminal and/or determining whether to allow to establish the target SLRB.

When the program is executed by the processor, all the implementation in the above-mentioned method embodiments applied to the terminal side as shown in FIG. 1 to FIG. 2 can be implemented. To avoid repetition, details are not described herein again.

Figure 11:
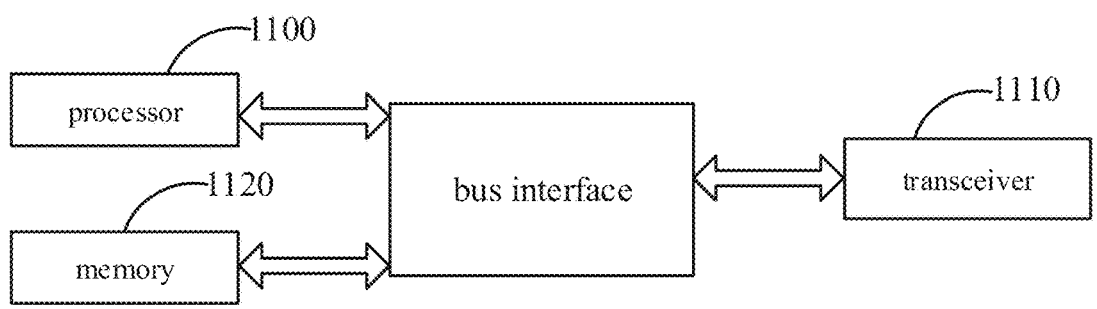
FIG. 11 is a structural block diagram of the network device according to an embodiment of the disclosure.

As shown in FIG. 11, an embodiment of the present disclosure also provides a network device. The network device is a first network device, and includes: a transceiver 1110, a memory 1120, a processor 1100, a program stored on the memory and executed by the processor, the transceiver 1110 is used to receive assistance information transmitted by the first terminal; the processor 1100 is used to read the program in the memory 1120, and execute the following process:

Performing SLRB configuration on the SLRB of the first terminal according to the assistance information; and/or, Determining whether the target SLRB is allowed to be established according to the assistance information.

Wherein, in FIG. 11, the bus architecture may include any number of interconnected buses and bridges. Specifically, various circuits of one or more processors represented by the processor 1100 and the memory represented by the memory 1120 are linked together. The bus architecture can also link various other circuits such as peripherals, voltage regulators, power management circuits, etc., which are all known in the art, and therefore, will not be further described herein. The bus interface provides the interface. The transceiver 1110 may be a plurality of elements, including a transmitter and a receiver, and provide a unit for communicating with various other devices on the transmission medium. The processor 1100 is responsible for managing the bus architecture and general processing, and the memory 1120 may store data used by the processor 1100 when performing operations.

Optionally, the assistance information includes at least one of the following:
Radio bearer identification (ID) of the target SLRB;
The logical channel ID of the target SLRB;
Part or all of the SLRB configuration information used when the first terminal transmit data by using the target SLRB.

Optionally, the processor 1100 is further configured to:
Generate indication information according to the determination result, the indication information is used to indicate whether the first terminal allows to establish the target SLRB and/or indicate the first terminal to use part or all of the SLRB configuration information used by the target SLRB to transmit data.

Optionally, the processor 1100 is further configured to:
When performing SLRB configuration on the target SLRB corresponding to the assistance information, configure the SLRB configuration information of the SLRB of the first terminal to be the same as the SLRB configuration information of the target SLRB;
When performing configuration on other SLRBs other than the target SLRB corresponding to the assistance information and belonging to the sidelink formed by the first terminal and the second terminal, configure a logical channel ID included in the SLRB configuration information of the other SLRBs to be different from the logical channel ID included in the SLRB configuration information of the target SLRB;
When performing configuration on other SLRBs other than the target SLRB corresponding to the assistance information and belonging to the sidelink formed by the first terminal and the second terminal and having the same source ID and the same target ID as the target SLRB, configure a logical channel ID included in the SLRB configuration information of the other SLRBs to be different from the logical channel ID included in the SLRB configuration information of the target SLRB;
When the logical channel ID included in the SLRB configuration information of other SLRBs other than the target SLRB corresponding to the assistance information and belonging to the sidelink formed by the first terminal and the second terminal is the same as the logical channel ID included in the SLRB configuration information of the target SLRB, update the logical channel IDs of the other SLRBs to be different from the logical channel ID included in the SLRB configuration information of the target SLRB;
When the logical channel ID included in the SLRB configuration information of other SLRBs other than the target SLRB corresponding to the assistance information and belonging to the sidelink formed by the first terminal and the second terminal and having the same source ID and the same target ID as the target SLRB is the same as the logical channel ID included in the SLRB configuration information of the target SLRB, update the logical channel IDs of the other SLRBs to be different from the logical channel ID included in the SLRB configuration information of the target SLRB.

Optionally, the SLRB configuration information includes at least one of the following:
Source ID;
Target ID;
Transmission type ID;
SLRB ID;
Service data adaptation protocol layer configuration information;
Packet data convergence protocol layer configuration information;
Radio link control layer configuration information;
Media access control layer configuration information;
Physical layer configuration information.

The embodiment of the present disclosure also provides a network device, which is a first network device. Since the principle of the first network device to solve the problem is similar to the sidelink interface radio bearer configuration method in the embodiment of the present disclosure, the implementation of the network device can refer to the implementation of the method, and the repetition will not be repeated.

The network device in the embodiment of the present disclosure receives assistance information transmitted by the first terminal; performs SLRB configuration on the SLRB of the first terminal according to the assistance information, and/or determines whether to allow to establish the target SLRB according to the assistance information, it can avoid the SLRB configuration conflicts for the same SLRB between the transmitting terminal and receiving terminal in the sidelink communication, and at the same time the SLRB configuration conflicts among different SLRBs of the same terminal is avoided.

It should be noted that the network device provided by the embodiment of the present disclosure is the first network device that can execute the above-mentioned sidelink interface radio bearer configuration method, so all embodiments of the above-mentioned sidelink interface radio bearer configuration method corresponding to the first network device are all applicable to the network device, and the same or similar beneficial effects may be achieved.

Figure 12:
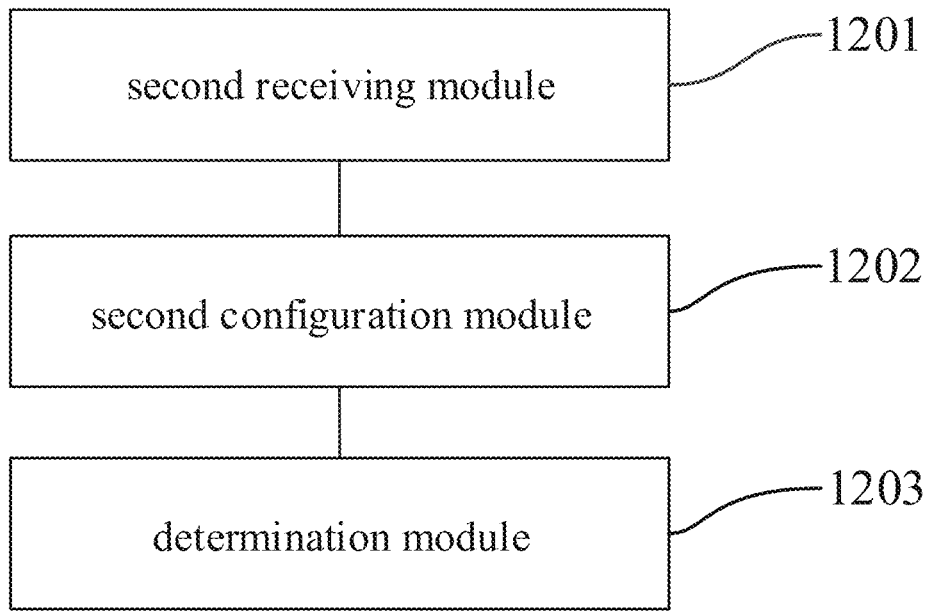
FIG. 12 is a schematic diagram of the modules of the network device according to an embodiment of the disclosure.

As shown in FIG. 12, the implementation of the present disclosure also provides a network device, the network device is a first network device, and includes:
A second receiving module 1201, configured to receive assistance information transmitted by the first terminal;
A second configuration module 1202, configured to perform SLRB configuration on the SLRB of the first terminal according to the assistance information; and/or,
A determining module 1203, configured to determine whether to allow to establish the target SLRB according to the assistance information.

Optionally, the assistance information includes at least one of the following:
Radio bearer identification (ID) of the target SLRB;
The logical channel ID of the target SLRB;
Part or all of the SLRB configuration information used when the first terminal transmit data by using the target SLRB.

The network device of the embodiment of the present disclosure may further include:

An information generating module, configured to generate indication information according to the determination result, the indication information is used to indicate whether the first terminal allows to establish the target SLRB and/or indicate the first terminal to use part or all of the SLRB configuration information used by the target SLRB to transmit data.

In the network device of the embodiment of the present disclosure, the second configuration module 1202 includes:

A sixth configuration unit, configured to, when performing SLRB configuration on the target SLRB corresponding to the assistance information, configure the SLRB configuration information of the SLRB of the first terminal to be the same as the SLRB configuration information of the target SLRB;

A seventh configuration unit, configured to, when performing configuration on other SLRBs other than the target SLRB corresponding to the assistance information and belonging to the sidelink formed by the first terminal and the second terminal, configure a logical channel ID included in the SLRB configuration information of the other SLRBs to be different from the logical channel ID included in the SLRB configuration information of the target SLRB;

An eighth configuration unit, configured to, when performing configuration on other SLRBs other than the target SLRB corresponding to the assistance information and belonging to the sidelink formed by the first terminal and the second terminal and having the same source ID and the same target ID as the target SLRB, configure a logical channel ID included in the SLRB configuration information of the other SLRBs to be different from the logical channel ID included in the SLRB configuration information of the target SLRB;

A ninth configuration unit, configured to, when the logical channel ID included in the SLRB configuration information of other SLRBs other than the target SLRB corresponding to the assistance information and belonging to the sidelink formed by the first terminal and the second terminal is the same as the logical channel ID included in the SLRB configuration information of the target SLRB, update the logical channel IDs of the other SLRBs to be different from the logical channel ID included in the SLRB configuration information of the target SLRB;

A tenth configuration unit, configured to, when the logical channel ID included in the SLRB configuration information of other SLRBs other than the target SLRB corresponding to the assistance information and belonging to the sidelink formed by the first terminal and the second terminal and having the same source ID and the same target ID as the target SLRB is the same as the logical channel ID included in the SLRB configuration information of the target SLRB, update the logical channel IDs of the other SLRBs to be different from the logical channel ID included in the SLRB configuration information of the target SLRB.

Optionally, the SLRB configuration information includes at least one of the following:
Source ID;
Target ID;
Transmission type ID;
SLRB ID;
Service data adaptation protocol layer configuration information;
Packet data convergence protocol layer configuration information;
Radio link control layer configuration information;
Media access control layer configuration information;
Physical layer configuration information.

The embodiment of the present disclosure also provides a network device, which is a first network device. Since the principle of the first network device to solve the problem is similar to the sidelink interface radio bearer configuration method in the embodiment of the present disclosure, the implementation of the network device can refer to the implementation of the method, and the repetition will not be repeated.

The network device of the embodiment of the present disclosure receives the assistance information transmitted by the first terminal through the second receiving module; the second configuration module performs SLRB configuration on the SLRB of the first terminal according to the assistance information, and/or the determination module determines whether the target SLRB is allowed to be established according to the assistance information. In this way, it can avoid the SLRB configuration conflicts for the same SLRB between the transmitting terminal and receiving terminal in the sidelink communication, and at the same time the SLRB configuration conflicts among different SLRBs of the same terminal is avoided.

It should be noted that the network device provided by the embodiment of the present disclosure is the first network device that can execute the above-mentioned sidelink interface radio bearer configuration method, so all embodiments of the above-mentioned sidelink interface radio bearer configuration methods corresponding to the first network device are all applicable to the network device, and the same or similar beneficial effects can be achieved.

In some embodiments of the present disclosure, a computer-readable storage medium is also provided, on which a computer program is stored, and when the program is executed by a processor, the following steps are implemented:

Receiving assistance information transmitted by the first terminal;
Performing SLRB configuration on the SLRB of the first terminal according to the assistance information; and/or,
According to the assistance information, determining whether the target SLRB is allowed to be established.

When the program is executed by the processor, all the implementation in the above-mentioned method embodiments applied to the network device side as shown in FIG. 3 to FIG. 4 can be implemented. To avoid repetition, details are not described herein again.

Figure 13:
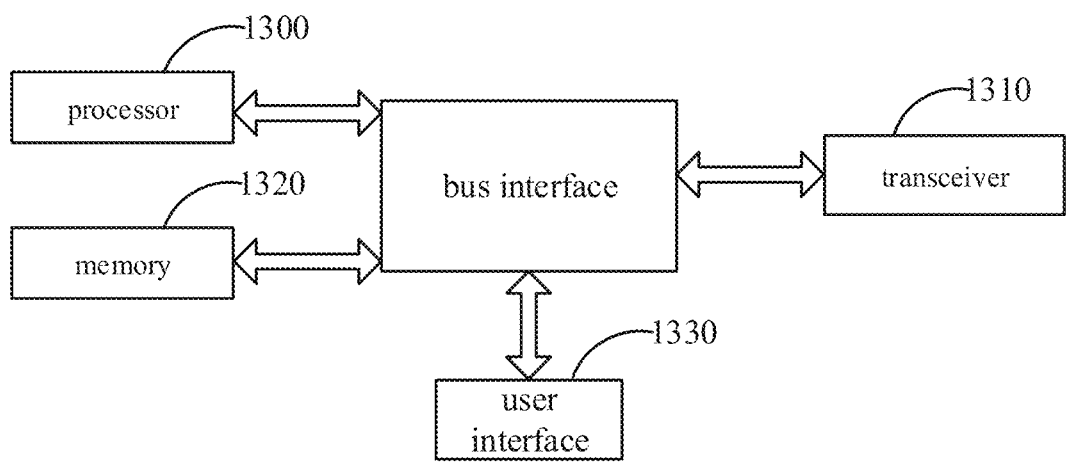
FIG. 13 is another structural block diagram of a terminal according to an embodiment of the disclosure.

As shown in FIG. 13, an embodiment of the present disclosure also provides a terminal. The terminal is a second terminal and includes: a memory 1320, a processor 1300, a transceiver 1310, a bus interface, and a program stored on the memory 1320 and executed by the processor 1300, and the transceiver 1310 is configured to transmit the SLRB configuration information of the target radio bearer SLRB of the sidelink interface to the first terminal.

Wherein, in FIG. 13, the bus architecture may include any number of interconnected buses and bridges. Specifically, various circuits of one or more processors represented by the processor 1300 and the memory represented by the memory 1320 are linked together. The bus architecture can also link various other circuits such as peripherals, voltage regulators, power management circuits, etc., which are all known in the art, and therefore, will not be further described herein. The bus interface provides the interface. The transceiver 1310 may be a plurality of elements, including a transmitter and a receiver, and provide a unit for communicating with various other devices on the transmission medium. For different user equipment, the user interface 1330 may also be an interface capable of connecting externally and internally with the required device. The connected device includes but not limited to a keypad, a display, a speaker, a microphone, a joystick, and the like.

The processor 1300 is responsible for managing the bus architecture and general processing, and the memory 1320 can store data used by the processor 1300 when performing operations.

Optionally, the transceiver 1310 is also used for:

Receiving a first response message transmitted by the first terminal, wherein the first response message is used to indicate that the target SLRB is successfully configured; or, Receiving a second response message transmitted by the first terminal, wherein the second response message is used to indicate that the target SLRB is not successfully configured.

Optionally, the second response message carries at least one of the following information:

Being empty;

A reason that the target SLRB is not successfully configured;

First indication information of part or all of logical channel IDs currently occupied by the first terminal on the sidelink formed by the first terminal and the second terminal;

Second indication information of part or all of the logical channel IDs currently occupied by the first terminal in the logical channel ID set corresponding to combination of the source ID and the target ID corresponding to the target SLRB on the sidelink formed by the first terminal and the second terminal;

Third indication information of all or part of the logical channel IDs currently available by the first terminal on the sidelink formed by the first terminal and the second terminal;

Fourth indication information of part or all of the logical channel IDs currently available by the first terminal in the logical channel ID set corresponding to the combination of the source ID and the target ID corresponding to the target SLRB on the sidelink formed by the first terminal and the second terminal.

Optionally, the transceiver 1310 is also used for:

Transmitting, to a second network device or a protocol layer of the second terminal responsible for SLRB configuration information management, request information for requesting to change the SLRB configuration information of the target SLRB.

Optionally, the request information carries at least one of the following information:

First indication information of part or all of logical channel IDs currently occupied by the first terminal on the sidelink formed by the first terminal and the second terminal;

Second indication information of part or all of the logical channel IDs currently occupied by the first terminal in the logical channel ID set corresponding to combination of the source ID and the target ID corresponding to the target SLRB on the sidelink formed by the first terminal and the second terminal;

Third indication information of all or part of the logical channel IDs currently available by the first terminal on the sidelink formed by the first terminal and the second terminal;

Fourth indication information of part or all of the logical channel IDs currently available by the first terminal in the logical channel ID set corresponding to the combination of the source ID and the target ID corresponding to the target SLRB on the sidelink formed by the first terminal and the second terminal.

Optionally, the second terminal is on the network and in a radio resource control idle state or inactive state, or the second terminal is off the network; correspondingly, the processor 1300 is configured to:

According to the request information, update a logical channel ID included in the SLRB configuration information of the target SLRB to make it different from a logical channel ID included in the SLRB configuration information of another SLRB currently being established or having been established between the first terminal and the second terminal; or, According to the request information, update the logical channel ID included in the SLRB configuration information of the target SLRB to make it different from a logical channel ID included in the SLRB configuration information of another SLRB currently being established or having been established between the first terminal and the second terminal and using the same source ID and the same target ID as the target SLRB.

Optionally, the protocol layer responsible for SLRB configuration information management is a radio resource control RRC protocol layer.

Optionally, the second network device is a serving base station, a serving distributed unit DU, or a serving centralized unit CU of the second terminal.

The embodiment of the present disclosure also provides a terminal, which is a second terminal. Since the principle of the second terminal to solve the problem is similar to the sidelink interface radio bearer configuration method of the embodiment of the present disclosure, the implementation of the terminal can refer to the implementation of the method, which will not be repeated.

The terminal of the embodiment of the present disclosure transmits the SLRB configuration information of the target radio bearer SLRB of the sidelink interface to the first terminal to provide a basis for the first terminal to determine whether to allow the establishment of the target SLRB, thereby avoiding the SLRB configuration conflicts for the same SLRB between the transmitting terminal and the receiving terminal of the sidelink communication, while avoiding the SLRB configuration conflicts among different SLRBs of the same terminal.

It should be noted that the terminal provided in the embodiments of the present disclosure is a second terminal capable of executing the above-mentioned sidelink interface radio bearer configuration method, then all the above-mentioned embodiments corresponding to the sidelink interface radio bearer configuration method on the second terminal side are applicable to the terminal, the same or similar beneficial effects can be achieved.

Figure 14:
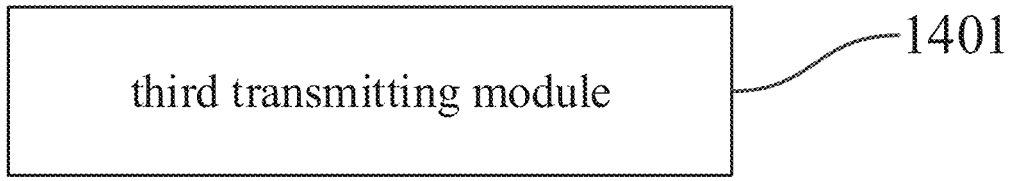
FIG. 14 is another schematic diagram of modules of a terminal according to an embodiment of the disclosure.

As shown in FIG. 14, an embodiment of the present disclosure also provides a terminal. The terminal is a second terminal and includes:

A third transmitting module 1401, configured to transmit the SLRB configuration information of the target radio bearer SLRB of the sidelink interface to the first terminal.

The terminal of the embodiment of the present disclosure further includes:

A third receiving module, configured to receive a first response message transmitted by the first terminal, wherein the first response message is used to indicate that the target SLRB is successfully configured; or receive a second response message transmitted by the first terminal, wherein the second response message is used to indicate that the target SLRB is not successfully configured.

Optionally, the second response message carries at least one of the following information:

Being empty;

A reason that the target SLRB is not successfully configured;

First indication information of part or all of logical channel IDs currently occupied by the first terminal on the sidelink formed by the first terminal and the second terminal;

Second indication information of part or all of the logical channel IDs currently occupied by the first terminal in the logical channel ID set corresponding to combination of the source ID and the target ID corresponding to the target SLRB on the sidelink formed by the first terminal and the second terminal;

Third indication information of all or part of the logical channel IDs currently available by the first terminal on the sidelink formed by the first terminal and the second terminal;

Fourth indication information of part or all of the logical channel IDs currently available by the first terminal in the logical channel ID set corresponding to the combination of the source ID and the target ID corresponding to the target SLRB on the sidelink formed by the first terminal and the second terminal.

The terminal of the embodiment of the present disclosure further includes:

A fourth transmitting module, configured to transmit, to a second network device or a protocol layer of the second terminal responsible for SLRB configuration information management, request information for requesting to change the SLRB configuration information of the target SLRB.

Optionally, the request information carries at least one of the following information:

First indication information of part or all of logical channel IDs currently occupied by the first terminal on the sidelink formed by the first terminal and the second terminal;

Second indication information of part or all of the logical channel IDs currently occupied by the first terminal in the logical channel ID set corresponding to combination of the source ID and the target ID corresponding to the target SLRB on the sidelink formed by the first terminal and the second terminal;

Third indication information of all or part of the logical channel IDs currently available by the first terminal on the sidelink formed by the first terminal and the second terminal;

Fourth indication information of part or all of the logical channel IDs currently available by the first terminal in the logical channel ID set corresponding to the combination of the source ID and the target ID corresponding to the target SLRB on the sidelink formed by the first terminal and the second terminal.

Optionally, the second terminal is on the network and in a radio resource control idle or inactive state, or the second terminal is off the network; correspondingly, the terminal of the embodiment of the present disclosure further includes:

A first configuration update module, configured to, according to the request information, update a logical channel ID included in the SLRB configuration information of the target SLRB to make it different from a logical channel ID included in the SLRB configuration information of another SLRB currently being established or having been established between the first terminal and the second terminal; or, according to the request information, update the logical channel ID included in the SLRB configuration information of the target SLRB to make it different from a logical channel ID included in the SLRB configuration information of another SLRB currently being established or having been established between the first terminal and the second terminal and using the same source ID and the same target ID as the target SLRB.

Optionally, the protocol layer responsible for SLRB configuration information management is a radio resource control RRC protocol layer.

Optionally, the second network device is a serving base station, a serving distributed unit DU, or a serving centralized unit CU of the second terminal.

The embodiment of the present disclosure also provides a terminal, which is a second terminal. Since the principle of the second terminal to solve the problem is similar to the sidelink interface radio bearer configuration method of the embodiment of the present disclosure, the implementation of the terminal can refer to the implementation of the method, the repetition will not be repeated.

The terminal of the embodiment of the present disclosure transmits the SLRB configuration information of the target radio bearer SLRB of the sidelink interface to the first terminal through the third transmitting module, which provides a basis for the first terminal to determine whether to allow the establishment of the target SLRB, thereby avoiding the SLRB configuration conflicts for the same SLRB between the transmitting terminal and the receiving terminal of the sidelink communication, while avoiding the SLRB configuration conflicts among different SLRBs of the same terminal.

It should be noted that the terminal provided in the embodiments of the present disclosure is a second terminal capable of executing the above-mentioned sidelink interface radio bearer configuration method, then all the above-mentioned embodiments corresponding to the sidelink interface radio bearer configuration method on the second terminal side are applicable to the terminal, the same or similar beneficial effects can be achieved.

In some embodiments of the present disclosure, a computer-readable storage medium is also provided, on which a computer program is stored, and when the program is executed by a processor, the following steps are implemented:

Transmitting the SLRB configuration information of the target radio bearer SLRB of the sidelink interface to the first terminal.

When the program is executed by the processor, all the implementation in the above-mentioned method embodiments applied to the terminal side as shown in FIG. 5 to FIG. 6 can be implemented. To avoid repetition, details are not described herein again.

Figure 15:
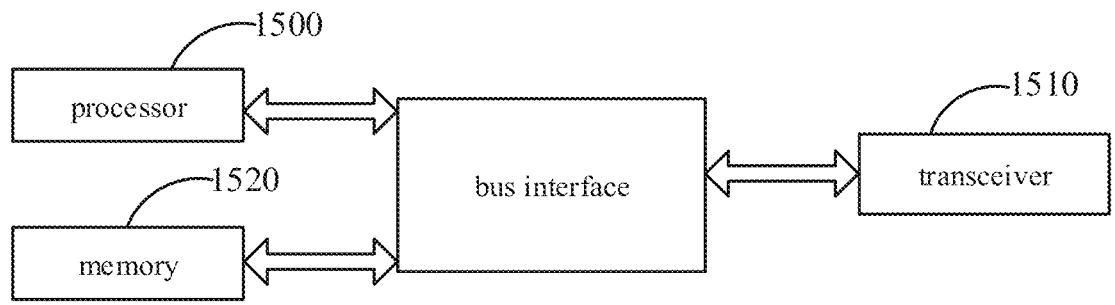
FIG. 15 is another structural block diagram of the network device according to an embodiment of the disclosure.

As shown in FIG. 15, an embodiment of the present disclosure also provides a network device. The network device is a second network device, including: a transceiver 1510, a memory 1520, a processor 1500, a program stored on the memory and executed by the processor, the transceiver 1510 is configured to receive request information for changing SLRB configuration information of a target SLRB transmitted by a second terminal, wherein the SLRB configuration information of the target SLRB is SLRB configuration information of the target SLRB transmitted by the second terminal to a first terminal through a sidelink interface;

The processor 1500 is configured to, according to the request information, update a logical channel ID included in the SLRB configuration information of the target SLRB to make it different from a logical channel ID included in the SLRB configuration information of another SLRB currently being established or having been established between the first terminal and the second terminal; or, according to the request information, update the logical channel ID included in the SLRB configuration information of the target SLRB to make it different from a logical channel ID included in the SLRB configuration information of another SLRB currently being established or having been established between the first terminal and the second terminal and using the same source ID and the same target ID as the target SLRB.

Wherein, in FIG. 15, the bus architecture may include any number of interconnected buses and bridges. Specifically, various circuits of one or more processors represented by the processor 1500 and the memory represented by the memory 1520 are linked together. The bus architecture can also link various other circuits such as peripherals, voltage regulators, power management circuits, etc., which are all known in the art, and therefore, will not be further described herein. The bus interface provides the interface. The transceiver 1510 may be a plurality of elements, including a transmitter and a receiver, and provide a unit for communicating with various other devices on the transmission medium. The processor 1500 is responsible for managing the bus architecture and general processing, and the memory 1520 can store data used by the processor 1500 when performing operations.

The embodiment of the present disclosure also provides a network device, which is a second network device. Since the principle of the second network device to solve the problem is similar to the sidelink interface radio bearer configuration method in the embodiment of the present disclosure, Therefore, the implementation of the network device can refer to the implementation of the method, and the repetition will not be repeated.

The network device of the embodiment of the present disclosure receives request information for changing SLRB configuration information of a target SLRB transmitted by a second terminal, wherein the SLRB configuration information of the target SLRB is SLRB configuration information of the target SLRB transmitted by the second terminal to a first terminal through a sidelink interface; the second configuration update module updates, according to the request information, a logical channel ID included in the SLRB configuration information of the target SLRB to make it different from a logical channel ID included in the SLRB configuration information of another SLRB currently being established or having been established between the first terminal and the second terminal; or, update, according to the request information, the logical channel ID included in the SLRB configuration information of the target SLRB to make it different from a logical channel ID included in the SLRB configuration information of another SLRB currently being established or having been established between the first terminal and the second terminal and using the same source ID and the same target ID as the target SLRB.

It should be noted that the network device provided by the embodiment of the present disclosure is a second network device capable of executing the above-mentioned sidelink interface radio bearer configuration method, then all embodiments of the above-mentioned sidelink interface radio bearer configuration method corresponding to the second network device are all applicable to the network device, and the same or similar beneficial effects can be achieved.

Figure 16:
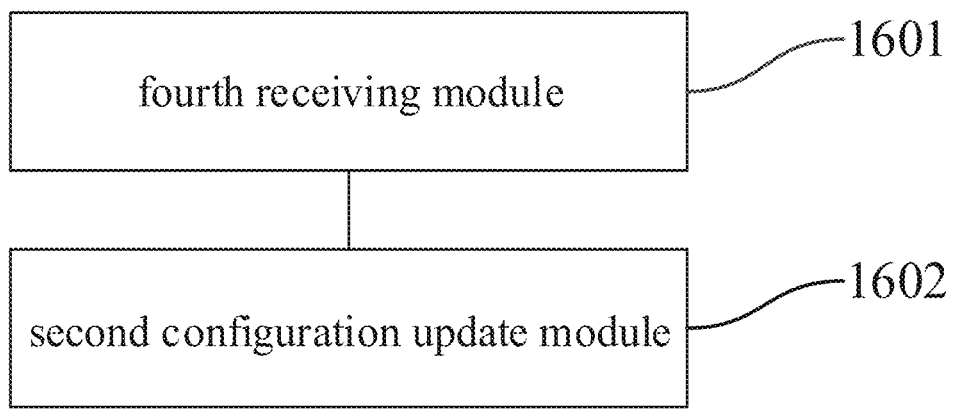
FIG. 16 is another schematic diagram of the modules of the network device according to an embodiment of the disclosure.

As shown in FIG. 16, an embodiment of the present disclosure also provides a network device, where the network device is a second network device, and includes:

A fourth receiving module 1601, configured to receive request information for changing SLRB configuration information of a target SLRB transmitted by a second terminal, wherein the SLRB configuration information of the target SLRB is SLRB configuration information of the target SLRB transmitted by the second terminal to a first terminal through a sidelink interface;

A second configuration update module 1602, configured to, according to the request information, update a logical channel ID included in the SLRB configuration information of the target SLRB to make it different from a logical channel ID included in the SLRB configuration information of another SLRB currently being established or having been established between the first terminal and the second terminal; or, according to the request information, update the logical channel ID included in the SLRB configuration information of the target SLRB to make it different from a logical channel ID included in the SLRB configuration information of another SLRB currently being established or having been established between the first terminal and the second terminal and using the same source ID and the same target ID as the target SLRB.

The embodiment of the present disclosure also provides a network device, which is a second network device. Since the principle of the second network device to solve the problem is similar to the sidelink interface radio bearer configuration method in the embodiment of the present disclosure, the implementation of the network side equipment can refer to the implementation of the method, and the repetition will not be repeated.

The network device of the embodiment of the present disclosure receives, through the fourth receiving module, request information for changing SLRB configuration information of a target SLRB transmitted by a second terminal, wherein the SLRB configuration information of the target SLRB is SLRB configuration information of the target SLRB transmitted by the second terminal to a first terminal through a sidelink interface; the second configuration update module updates, according to the request information, a logical channel ID included in the SLRB configuration information of the target SLRB to make it different from a logical channel ID included in the SLRB configuration information of another SLRB currently being established or having been established between the first terminal and the second terminal; or, updates, according to the request information, the logical channel ID included in the SLRB configuration information of the target SLRB to make it different from a logical channel ID included in the SLRB configuration information of another SLRB currently being established or having been established between the first terminal and the second terminal and using the same source ID and the same target ID as the target SLRB, which can avoid the SLRB configuration conflicts on the same SLRB between the transmitting terminal and the receiving terminal of the sidelink communication, and at the same time avoiding the SLRB configuration conflicts among different SLRBs of the same terminal.

It should be noted that the network device provided by the embodiment of the present disclosure is a second network device capable of executing the above-mentioned sidelink interface radio bearer configuration method, then all embodiments of the above-mentioned sidelink interface radio bearer configuration method corresponding to the second network device are all applicable to the network device, and the same or similar beneficial effects can be achieved.

In some embodiments of the present disclosure, a computer-readable storage medium is also provided, on which a computer program is stored, and when the program is executed by a processor, the following steps are implemented:

Receiving request information for changing SLRB configuration information of a target SLRB transmitted by a second terminal, wherein the SLRB configuration information of the target SLRB is SLRB configuration information of the target SLRB transmitted by the second terminal to a first terminal through a sidelink interface;

According to the request information, updating a logical channel ID included in the SLRB configuration information of the target SLRB to make it different from a logical channel ID included in the SLRB configuration information of another SLRB currently being established or having been established between the first terminal and the second terminal; or, According to the request information, updating the logical channel ID included in the SLRB configuration information of the target SLRB to make it different from a logical channel ID included in the SLRB configuration information of another SLRB currently being established or having been established between the first terminal and the second terminal and using the same source ID and the same target ID as the target SLRB.

When the program is executed by the processor, all the implementation in the above-mentioned method embodiments applied to the network device as shown in FIG. 7 to FIG. 8 can be implemented. To avoid repetition, details are not described herein again.

It should be understood that the above division of each module is only a division of logical functions, and can be fully or partially integrated into one physical entity in actual implementation, or can be physically separated. These modules can all be implemented in the form of software called by processing elements; they can also be implemented in the form of hardware; some modules can be implemented in the form of calling software by processing elements, and some of the modules can be implemented in the form of hardware. For example, the determination module may be a separately established processing element, or it may be integrated into a certain chip of the above-mentioned device. In addition, it may also be stored in the memory of the above-mentioned device in the form of program code, which is called and executed by a certain processing element of the above-mentioned device to implement the functions of the above-identified module. The implementation of other modules is similar. In addition, all or part of these modules can be integrated together or implemented independently. The processing element described here may be an integrated circuit with signal processing capability. In the implementation process, each step of the above method or each of the above modules can be implemented by an integrated logic circuit of hardware in the processor element or instructions in the form of software.

For example, each module, unit, sub-unit or sub-module may be one or more integrated circuits configured to implement the above method, for example: one or more specific integrated circuits (Application Specific Integrated Circuit, ASIC), or, one or more microprocessors (digital signal processor, DSP), or, one or more Field Programmable Gate Array (FPGA), etc. For another example, when one of the above modules is implemented in the form of processing element scheduling program code, the processing element may be a general-purpose processor, such as a central processing unit (CPU) or other processors that can call program codes. For another example, these modules can be integrated together and implemented in the form of a system-on-a-chip (SOC).

The terms "first", "second", etc. in the specification and claims of the present disclosure are used to distinguish similar objects, and not necessarily used to describe a specific sequence. It should be understood that the data used in this way can be interchanged under appropriate circumstances so that the embodiments of the present disclosure described herein can be implemented in a sequence other than those illustrated or described herein. In addition, the terms "including" and "comprising" and any variations of them are intended to cover non-exclusive inclusion. For example, a process, method, system, product, or device that includes a series of steps or units is not necessarily limited to those clearly listed. Those steps or units may include other steps or units that are not clearly listed or are inherent to these processes, methods, products, or devices. In addition, the use of "and/or" in the specification and claims means at least one of the connected objects, such as A and/or B and/or C, which means 7 situations including A alone, B alone, C alone, A and B, B and C, A and C, and A, B, and C. Similarly, the use of "at least one of A and B" in this specification and claims should be understood as "A alone, B alone, or both A and B".

In the various embodiments of the present disclosure, it should be understood that the value of the sequence numbers of the foregoing processes does not mean the order of execution, and the order of execution of each process should be determined by its function and internal logic, and should not constitute any limitation on the implementation process of the embodiments of the present disclosure.

The above are optional implementations of the present disclosure. It should be pointed out that for those of ordinary skill in the art, several improvements and modifications can be made without departing from the principles of the present disclosure. These improvements and modifications should also be regarded as the protection scope of the present disclosure.

What is claimed is:

1. A sidelink interface radio bearer configuration method, applied to a first terminal, comprising:
receiving sidelink radio bearer (SLRB) configuration information transmitted by a second terminal;
determining whether to allow to establish a target SLRB according to the SLRB configuration information; or
determining whether to allow to establish the target SLRB according to the SLRB configuration information, and in a case that the determination result is that the target SLRB is allowed to be established and all or part of parameters of the SLRB are different from parameters of a currently being established SLRB, transmitting assistance information to a first network device serving the first terminal or a protocol layer of the first terminal responsible for SLRB configuration information management;

wherein the assistance information includes at least one of the following:

radio bearer identification (ID) of the target SLRB;

logical channel ID of the target SLRB;

part or all of the SLRB configurations transmitted by the first terminal;

wherein after determining whether to allow to establish the target SLRB according to the SLRB configuration information, the method further comprises:

when the determination result is that the target SLRB is refused to be established, transmitting a response message to the second terminal, wherein the response message is used to indicate that the first terminal refuses to establish the target SLRB;

wherein the determining whether to allow to establish the target SLRB according to the SLRB configuration information comprises:

determining whether a logical channel ID included in SLRB configuration information corresponding to the target SLRB currently being established between the first terminal and the second terminal is the same as a logical channel ID included in SLRB configuration information corresponding to another SLRB that has been established or is being established between the first terminal and the second terminal; or, determining whether the logical channel ID included in the SLRB configuration information corresponding to the target SLRB currently being established between the first terminal and the second terminal is the same as a logical channel ID included in SLRB configuration information corresponding to another SLRB that has been established or is being established between the first terminal and the second terminal and has a same source ID and a same destination ID as the target SLRB; or, determining whether a radio bearer ID included in SLRB configuration information corresponding to the target SLRB currently being established between the first terminal and the second terminal is the same as a radio bearer ID included in the SLRB configuration information corresponding to another SLRB that has been established or is being established between the first terminal and the second terminal; or, determining whether the radio bearer ID included in the SLRB configuration information corresponding to the target SLRB currently being established between the first terminal and the second terminal is the same as a radio bearer ID included in SLRB configuration information corresponding to another SLRB that has been established or is being established between the first terminal and the second terminal and has the same source ID and the same destination ID as the target SLRB;

when the determination result is not the same, allowing to establish the target SLRB; or, when the determination result is the same and a target condition is met, allowing to establish the target SLRB; otherwise, refusing to establish the target SLRB.

2. The method according to claim 1, wherein the first terminal is on the network and in a radio resource control (RRC) idle or inactive state, or the first terminal is off the network, after transmitting the assistance information to the first network device or the protocol layer of the first terminal responsible for SLRB configuration information management, the method further includes:

performing, by the protocol layer of the first terminal responsible for the SLRB configuration information management, SLRB configuration on the SLRB of the first terminal according to the assistance information, wherein the performing, by the protocol layer of the first terminal responsible for the SLRB configuration information management, SLRB configuration on the SLRB of the first terminal according to the assistance information includes at least one of the following:

when performing the SLRB configuration on the target SLRB corresponding to the assistance information, configuring the SLRB configuration information of the SLRB of the first terminal to be the same as the SLRB configuration information of the target SLRB;

when performing configuration on other SLRBs other than the target SLRB corresponding to the assistance information and belonging to the sidelink formed by the first terminal and the second terminal, configuring a logical channel ID included in the SLRB configuration information of the other SLRBs to be different from the logical channel ID included in the SLRB configuration information of the target SLRB;

when performing configuration on other SLRBs other than the target SLRB corresponding to the assistance information and belonging to the sidelink formed by the first terminal and the second terminal and having a same source ID and a same target ID as the target SLRB, configuring a logical channel ID included in the SLRB configuration information of the other SLRBs to be different from the logical channel ID included in the SLRB configuration information of the target SLRB;

when the logical channel ID included in the SLRB configuration information of the other SLRBs other than the target SLRB corresponding to the assistance information and belonging to the sidelink formed by the first terminal and the second terminal is the same as the logical channel ID included in the SLRB configuration information of the target SLRB, updating the logical channel ID of the other SLRBs to be different from the logical channel ID included in the SLRB configuration information of the target SLRB;

when the logical channel ID included in the SLRB configuration information of the other SLRBs other than the target SLRB corresponding to the assistance information and belonging to the sidelink formed by the first terminal and the second terminal and having the same source ID and the same target ID as the target SLRB is the same as the logical channel ID included in the SLRB configuration information of the target SLRB, updating the logical channel ID of the other SLRBs to be different from the logical channel ID included in the SLRB configuration information of the target SLRB.

3. The method according to claim 1, wherein the response message carries at least one of the following information:

a reason that the first terminal refuses to establish the target SLRB;

first indication information of part or all of logical channel IDs currently occupied by the first terminal on the sidelink formed by the first terminal and the second terminal;

second indication information of part or all of the logical channel IDs currently occupied by the first terminal in a logical channel ID set corresponding to combination of the source ID and the target ID corresponding to the target SLRB on the sidelink formed by the first terminal and the second terminal;

third indication information of all or part of the logical channel IDs currently available by the first terminal on the sidelink formed by the first terminal and the second terminal;

fourth indication information of part or all of the logical channel IDs currently available by the first terminal in the logical channel ID set corresponding to the combination of the source ID and the target ID corresponding to the target SLRB on the sidelink formed by the first terminal and the second terminal.

4. The method according to claim 1,
wherein the target condition includes at least one of the following:

a quality of service (QOS) parameter of the target SLRB being higher than a QoS parameter of another SLRB currently being established between the first terminal and the second terminal and using a same logic channel ID or a same radio bearer ID as the target SLRB;

the QoS parameter of the target SLRB being higher than a QoS parameter of another SLRB currently being established between the first terminal and the second terminal and using a same source ID, a same destination ID and a same logic channel ID or using a same source ID, a same destination ID and a same radio bearer ID as the target SLRB;

the QoS parameter of the target SLRB being higher than a QoS parameter of another SLRB currently having been established between the first terminal and the second terminal and using a same logic channel ID or a same radio bearer ID as the target SLRB;

the QoS parameter of the target SLRB being higher than a QoS parameter of another SLRB currently having been established between the first terminal and the second terminal and using a same source ID, a same destination ID and a same logic channel ID or using a same source ID, a same destination ID and a same radio bearer ID as the target SLRB;

a priority of the second terminal that initiates the establishment of the target SLRB being higher than a priority of a terminal that initiates the establishment of the other SLRB that uses the same logical channel ID or the same radio bearer ID as the target SLRB;

an initiation time of the target SLRB being earlier than an initiation time of the other SLRB that uses the same logical channel ID or the same radio bearer ID as the target SLRB.

5. The method according to claim 1, wherein the SLRB configuration information includes at least one of the following:

source ID;
target ID;
transmission type ID;
SLRB ID;
service data adaptation protocol layer configuration information;
packet data convergence protocol layer configuration information;
radio link control layer configuration information;
media access control layer configuration information;
physical layer configuration information.

6. The method according to claim 1, wherein the protocol layer responsible for SLRB configuration information management is an RRC protocol layer.

7. The method according to claim 1, wherein the first network device is a serving base station, a serving distributed unit, or a serving centralized unit of the first terminal.

8. A sidelink interface radio bearer configuration method, applied to a first network device, comprising:

receiving assistance information transmitted by a first terminal;

performing SLRB configuration on SLRB of the first terminal according to the assistance information; and/or, determining whether a target SLRB is allowed to be established according to the assistance information;

wherein the assistance information includes at least one of the following:

radio bearer identification (ID) of the target SLRB;
logical channel ID of the target SLRB;
part or all of the SLRB configurations transmitted by the first terminal;

wherein the performing SLRB configuration on the SLRB of the first terminal according to the assistance information includes at least one of the following:

when performing the SLRB configuration on the target SLRB corresponding to the assistance information, configuring the SLRB configuration information of the SLRB of the first terminal to be the same as the SLRB configuration information of the target SLRB;

when performing configuration on other SLRBs other than the target SLRB corresponding to the assistance information and belonging to the sidelink formed by the first terminal and the second terminal, configuring a logical channel ID included in the SLRB configuration information of the other SLRBs to be different from the logical channel ID included in the SLRB configuration information of the target SLRB;

when performing configuration on other SLRBs other than the target SLRB corresponding to the assistance information and belonging to the sidelink formed by the first terminal and the second terminal and having a same source ID and a same target ID as the target SLRB, configuring a logical channel ID included in the SLRB configuration information of the other SLRBs to be different from the logical channel ID included in the SLRB configuration information of the target SLRB;

when the logical channel ID included in the SLRB configuration information of the other SLRBs other than the target SLRB corresponding to the assistance information and belonging to the sidelink formed by the first terminal and the second terminal is the same as the logical channel ID included in the SLRB configuration information of the target SLRB, updating the logical channel ID of the other SLRBs to be different from the logical channel ID included in the SLRB configuration information of the target SLRB;

when the logical channel ID included in the SLRB configuration information of the other SLRBs other than the target SLRB corresponding to the assistance information and belonging to the sidelink formed by the first terminal and the second terminal and having the same source ID and the same target ID as the target SLRB is the same as the logical channel ID included in the SLRB configuration information of the target SLRB, updating the logical channel ID of the other SLRBs to be different from the logical channel ID included in the SLRB configuration information of the target SLRB.

9. The method according to claim 8,
wherein after determining whether the target SLRB is allowed to be established according to the assistance information, the method further comprises:
generating indication information according to the determination result, wherein the indication information is used to indicate whether the first terminal allows to establish the target SLRB and/or indicate the first terminal to use part or all of the SLRB configuration information used by the target SLRB to transmit data;
wherein the SLRB configuration information includes at least one of the following:
source ID;
target ID;
transmission type ID;
SLRB ID;
service data adaptation protocol layer configuration information;
packet data convergence protocol layer configuration information;
radio link control layer configuration information;
media access control layer configuration information;
physical layer configuration information.

10. A sidelink interface radio bearer configuration method, applied to a second terminal, comprising:
transmitting SLRB configuration information to a first terminal;
receiving a response message transmitted by the first terminal, wherein the response message is used to indicate that the first terminal refuses to establish a target SLRB;
wherein after the receiving the response message transmitted by the first terminal, the method further comprises:
transmitting, to a second network device or a protocol layer of the second terminal responsible for SLRB configuration information management, request information for requesting to change the SLRB configuration information of the target SLRB.

11. The method according to claim 10, wherein the response message carries at least one of the following information:
a reason that the first terminal refuses to establish the target SLRB;
first indication information of part or all of logical channel IDs currently occupied by the first terminal on the sidelink formed by the first terminal and the second terminal;
second indication information of part or all of the logical channel IDs currently occupied by the first terminal in a logical channel ID set corresponding to combination of the source ID and the target ID corresponding to the target SLRB on the sidelink formed by the first terminal and the second terminal;
third indication information of all or part of the logical channel IDs currently available by the first terminal on the sidelink formed by the first terminal and the second terminal;
fourth indication information of part or all of the logical channel IDs currently available by the first terminal in the logical channel ID set corresponding to the combination of the source ID and the target ID corresponding to the target SLRB on the sidelink formed by the first terminal and the second terminal.

12. The method according to claim 10, wherein the request information carries at least one of the following information:
first indication information of part or all of logical channel IDs currently occupied by the first terminal on the sidelink formed by the first terminal and the second terminal;
second indication information of part or all of the logical channel IDs currently occupied by the first terminal in a logical channel ID set corresponding to combination of the source ID and the target ID corresponding to the target SLRB on the sidelink formed by the first terminal and the second terminal;
third indication information of all or part of the logical channel IDs currently available by the first terminal on the sidelink formed by the first terminal and the second terminal;
fourth indication information of part or all of the logical channel IDs currently available by the first terminal in the logical channel ID set corresponding to the combination of the source ID and the target ID corresponding to the target SLRB on the sidelink formed by the first terminal and the second terminal;
or,
wherein the second terminal is on the network and in an RRC idle state or inactive state, or the second terminal is off the network;
after transmitting, to a protocol layer of the second terminal responsible for SLRB configuration information management, request information for requesting to change the SLRB configuration information of the target SLRB, the method further includes:
according to the request information, updating a logical channel ID included in the SLRB configuration information of the target SLRB to make it different from a logical channel ID included in the SLRB configuration information of another SLRB currently being established or having been established between the first terminal and the second terminal; or,
according to the request information, updating the logical channel ID included in the SLRB configuration information of the target SLRB to make it different from a logical channel ID included in the SLRB configuration information of another SLRB currently being established or having been established between the first terminal and the second terminal and using a same source ID and a same target ID as the target SLRB,
or,
wherein the protocol layer responsible for SLRB configuration information management is an RRC protocol layer,
or,
wherein the second network device is a serving base station, a serving distributed unit, or a serving centralized unit of the second terminal.

13. A sidelink interface radio bearer configuration method, applied to a second network device, comprising:
receiving request information for changing SLRB configuration information of a target SLRB transmitted by a second terminal, wherein the SLRB configuration information of the target SLRB is SLRB configuration information of the target SLRB transmitted by the second terminal to a first terminal through a sidelink interface;
according to the request information, updating a logical channel ID included in the SLRB configuration information of the target SLRB to make it different from a logical channel ID included in the SLRB configuration information of another SLRB currently being established or having been established between the first terminal and the second terminal; or, according to the request information, updating the logical channel ID included in the SLRB configuration information of the target SLRB to make it different from a logical channel ID included in the SLRB configuration information of another SLRB currently being established or having been established between the first terminal and the second terminal and using a same source ID and a same target ID as the target SLRB.

14. A terminal, the terminal being a first terminal, comprising: a transceiver, a memory, a processor, and a program stored on the memory and executed by the processor to implement the sidelink interface radio bearer configuration method according to claim 1.

15. A network device includes: a transceiver, a memory, a processor, and a program stored in the memory and executed by the processor, the processor reads the program in the memory and executes sidelink interface radio bearer configuration method according to claim 8.

16. A terminal, being a second terminal, comprising: a transceiver, a memory, a processor, and a program stored on the memory and executed by the processor to implement the sidelink interface radio bearer configuration method according to claim 10.

17. A network device, comprising: a transceiver, a memory, a processor, and a program stored in the memory and executed by the processor, the processor reads the program in the memory and executes sidelink interface radio bearer configuration method according to claim 13.

* * * * *